US008565909B2

(12) United States Patent
Bickel et al.

(10) Patent No.: US 8,565,909 B2
(45) Date of Patent: Oct. 22, 2013

(54) FABRICATION OF MATERIALS WITH DESIRED CHARACTERISTICS FROM BASE MATERIALS HAVING DETERMINED CHARACTERISTICS

(75) Inventors: Bernd Bickel, Zürich (CH); Wojciech Matusik, Lexington, MA (US); Miguel A. Otaduy, Madrid (ES); Markus Gross, Uster (CH); Hanspeter Pfister, Arlington, MA (US)

(73) Assignee: Disney Enterprises, Inc., Burbank, CA (US)

( * ) Notice: Subject to any disclaimer, the term of this patent is extended or adjusted under 35 U.S.C. 154(b) by 270 days.

(21) Appl. No.: 13/031,036

(22) Filed: Feb. 18, 2011

(65) Prior Publication Data

US 2012/0053716 A1    Mar. 1, 2012

Related U.S. Application Data

(60) Provisional application No. 61/307,833, filed on Feb. 24, 2010.

(51) Int. Cl.
*G06F 19/00* (2011.01)

(52) U.S. Cl.
USPC .................................. 700/98; 703/2; 358/474

(58) Field of Classification Search
USPC .................................. 700/98; 703/2; 358/474
See application file for complete search history.

(56) References Cited

U.S. PATENT DOCUMENTS

| 6,718,291 B1 * | 4/2004 | Shapiro et al. ................... 703/2 |
| 2004/0190085 A1 * | 9/2004 | Silverbrook et al. ......... 358/474 |
| 2006/0184343 A1 * | 8/2006 | Chin et al. ........................ 703/2 |
| 2009/0254572 A1 * | 10/2009 | Redlich et al. .................. 707/10 |
| 2010/0250497 A1 * | 9/2010 | Redlich et al. ................ 707/661 |
| 2011/0033887 A1 * | 2/2011 | Fang et al. ...................... 435/41 |
| 2011/0161054 A1 * | 6/2011 | Woolf et al. ...................... 703/1 |

OTHER PUBLICATIONS

Barbič, et al., "Real-time subspace integration for St. Venant-Kirchhoff deformable models," *ACM Trans. Graph.*, Aug. 2005, vol. 24, No. 3, pp. 982-990.

Bathe, K. J., *Finite Element Procedures*, Prentice Hall, 1995, 10 pages.

Becker, et al., "Robust and efficient estimation of elasticity parameters using the linear finite element method," *SimVis*, 2007, pp. 15-28.

(Continued)

*Primary Examiner* — Mohammad Ali
*Assistant Examiner* — Anthony Whittington
(74) *Attorney, Agent, or Firm* — Kilpatrick Townsend & Stockton LLP

(57) ABSTRACT

In an object generation system, consumable base materials are characterized in a characterization process wherein an object generation system can use a plurality of so-characterized base materials. User input representing a desired object and set of characteristics for that desired object are processed, using a computer or computing device, to derive a mapping of locations for placement of portions of the plurality of base materials such that when the mapping is provided to an object generator, the generated object approximates the representing a desired object and set of characteristics. The characterization of a base material might include elasticity of the base material, the user input might be a desired shape and elasticity, the object generator might be a 3D multi-material printer and the generated object might at least approximate the desired shape and elasticity as a result of being constructed from the plurality of base materials used by the printer.

11 Claims, 12 Drawing Sheets

(56) References Cited

OTHER PUBLICATIONS

Bickel, et al., "Capture and modeling of non-linear heterogeneous soft tissue," *ACM Trans. Graph.*, Jul. 2009, vol. 28, No. 3, 9 pages.
Dilorenzo, et al., "Laughing out loud: Control for modeling anatomically inspired laughter using audio," *ACM Trans. Graph.*, Dec. 2008, vol. 27, No. 5, 8 pages.
James, et al., "Artdefo—accurate real time deformable objects," *Proc. of SIGGRAPH 99*, Computer Graphics Proceedings, 1999, pp. 65-72.
Kajberg, J., et al., "Characterisation of materials subjected to large strains by inverse modelling based on in-plane displacement fields," *International Journal of Solids and Structures*, 2004, vol. 41, No. 13, pp. 3439-3459.
Kauer, et al., "Inverse finite element characterization of soft tissues," *Medical Image Analysis*, 2002, vol. 6, No. 3, pp. 257-287.
Kharevych, et al., "Numerical coarsening of inhomogeneous elastic materials," *ACM Trans. Graph.*, Jul. 2009, vol. 28, No. 3, 8 pages.
Koch, et al., "Stimulating facial surgery using finite element methods," *Proc. of SIGGRAPH 96*, Computer Graphics Proc., 1996, pp. 421-428.
Land, et al., "An automatic method of solving discrete programming problems," *Econometrica*, 1960, vol. 28, No. 3, pp. 497-520.
Lang, et al., "Acquisition of elastic models for interactive simulation," *International Journal of Robotics Research*, 2002, vol. 21, No. 8, pp. 713-733.
Lee, et al., "Heads up!: biomechanical modeling and neuromuscular control of the neck," *ACM Trans. Graph.*, Jul. 2006, vol. 25, No. 3, pp. 1188-1198.
Lee, et al., "Comprehensive biomechanical modeling and simulation of the upper body," *ACM Trans. Graph.*, Aug. 2009, vol. 28, No. 4, 17 pages.
Lund, et al., "On structural optimization of composite shell structures using a discrete constitutive parameterization," *Wind Energy*, 2005, vol. 8, pp. 109-124.
Magnenat-Thalmann, et al., "A computational skin model: fold and wrinkle formation," *IEEE Trans. on Information Technology in Biomedicin*, 2002, vol. 6, No. 4, pp. 317-323.
Mikolajczyk, et al., "Scale & affine invariant interest point detectors," *International Journal of Computer Vision*, 2004, vol. 60, No. 1, pp. 63-86.
Mitani, et al., "Making papercraft toys from meshes using strip-based approximate unfolding," *ACM Trans. Graph.*, Aug. 2004, vol. 23, No. 3, pp. 259-263.
Mori, et al., "Plushie: An interactive design system for plush toys," *ACM Trans. Graph.*, Jul. 2007, vol. 26, No. 3, 8 pages.
Müller, et al., "Interactive virtual materials," *Graphics Interface*, 2004, pp. 239-246.
Nealen, et al., "Physically based deformable models in computer graphics," *Computer Graphics Forum*, Dec. 2006, vol. 25, No. 4, pp. 809-836.
Nesme, et al., "Preserving topology and elasticity for embedded deformable models," *ACM Trans. Graph.*, Jul. 2009, vol. 28, No. 3, 9 pages.
Neumaier, et al., "Linear systems with large uncertainties with applications to truss structures," *Reliable Computing*, 2007, vol. 13, pp. 149-172.
"Connex500 Multi-Material 3D Printing System," http://www.objet.com/3D-Printer/Connex500/, 4 pages.
O'Brien, et al., "Graphical modeling and animation of brittle fracture," *Proc. of SIGGRAPH 99*, Computer Graphics Proc., 1999, pp. 137-146.
Ogden, R. W., *Non-Linear Elastic Deformations*, Courier Dover Publications, 1997.
Okabe, et al., "Three dimensional apparel cad system," *Computer Graphics, Proc. of SIGGRAPH 92*, 1992, pp. 105-110.
Pai, et al., "Scanning physical interaction behavior of 3d objects," *Proc. of ACM SIGGRAPH 2001*, Computer Graphics Proc., 2001, pp. 87-96.
Rebonato, et al., "The most general methodology to create a valid correlation matrix for risk management and option pricing purposes," Tech. rep., Quantitative Research Centre, NatWest Group, 1999.
Schnur, et al., "An inverse method for determining elastic material properties and a material interface," *International Journal for Numerical Methods in Engineering, 1992*, vol. 33, No. 10, pp. 2039-2057.
Schoner, et al., "Measurement-based interactive simulation of viscoelastic solids," *Computer Graphics Forum*, Sep. 2004, vol. 23, No. 3, pp. 547-556.
Sifakis, et al., "Automatic determination of facial muscle activations from sparse motion capture marker data," *ACM Trans. Graph.*, Aug. 2005, vol. 24, No. 3, pp. 417-425.
Sueda, et al., "Musculotendon simulation for hand animation," *ACM Trans. Graph.*, Aug. 2008, vol. 27, No. 3, 8 pages.
Svoboda, et al., "A convenient multi-camera self-calibration for virtual environments," *PRESENCE: Teleoperators and Virtual Environments*, Aug. 2005, vol. 14, No. 4, pp. 407-422.
Teran, et al., "Creating and simulating skeletal muscle from the visible human data set," *IEEE Trans. on Visualization and Computer Graphics*, May/Jun. 2005, vol. 11, No. 3, pp. 317-328.
Terzopoulos, et al., "Elastically deformable models," *Computer Graphics, Proc. of SIGGRAPH 87*, 1987, pp. 205-214.
Terzopoulus, et al., "Analysis and synthesis of facial image sequences using physical and anatomical models," *IEEE Trans. on Pattern Analysis and Machine Intelligence (PAMI)*, 1993, vol. 14, pp. 569-579.
Zohdi, et al., *Introduction to Computational Micromechanics*, Springer-Verlag New York, Inc., 2004.
Zordan, et al., "Breathe easy: model and control of simulated respiration for animation," *2004 ACM SIGGRAPH / Eurographics Symposium on Computer Animation*, 2004, pp. 29-37.

* cited by examiner

| Material | Force (N) | Displacement error (mm) | | |
| --- | --- | --- | --- | --- |
| | | Avg. | St. Dev. | Max |
| Foam (very soft) | 1N | 0.84 | 0.45 | 2.55 |
| | 3N | 1.72 | 1.00 | 6.74 |
| | 5N | 2.04 | 0.88 | 5.70 |
| Foam (medium) | 5N | 1.40 | 0.57 | 3.44 |
| | 15N | 1.06 | 0.36 | 2.46 |
| | 25N | 1.33 | 0.90 | 5.19 |
| Foam (stiff) | 10N | 0.73 | 0.43 | 2.70 |
| | 20N | 0.94 | 0.40 | 2.71 |
| | 30N | 1.20 | 0.38 | 2.22 |
| Printed TBP1 (soft) | 5N | 2.14 | 0.68 | 4.47 |
| | 10N | 2.40 | 0.77 | 4.67 |
| | 20N | 3.60 | 1.22 | 6.55 |
| Printed DM502 (medium) | 5N | 0.69 | 0.26 | 1.44 |
| | 15N | 0.85 | 0.41 | 2.09 |
| | 25N | 1.31 | 0.51 | 3.00 |
| Printed TBP5 (stiff) | 10N | 0.68 | 0.22 | 1.15 |
| | 20N | 0.99 | 0.27 | 1.70 |
| | 30N | 1.30 | 0.311 | 2.61 |

Figure 12

FABRICATION OF MATERIALS WITH DESIRED CHARACTERISTICS FROM BASE MATERIALS HAVING DETERMINED CHARACTERISTICS

CROSS REFERENCE TO RELATED APPLICATIONS

The present Non-provisional Application claims benefit of priority under 35 USC §119(e) of U.S. Provisional Patent Application No. 61/307,833, filed Feb. 24, 2010, titled "Design and Fabrication of Materials With Desired Deformation Behavior", the entire contents of which are herein incorporated by reference for all purposes.

BACKGROUND

The present invention relates to object fabrication systems in general and in particular to fabrication of objects using a plurality of base materials and a device that can place base material under computer or electronic device command.

Many objects have properties that depend on the material they are constructed from. For example, marble statues are hard and feather pillows are soft. Often, the properties of an object are assumed to be fixed and determined by their construction. For example, the color of a loaf of bread is expected to be white, tan or brown. The shape of is also often determined by the method of manufacture—bread is usually round or loaf-shaped, crusty on the outside and soft on the inside, all as a result of the need for a pan to hold the bread and the fact that the oven's heat hits the outside surface more than the inside.

It has long been known in the field of computer graphics that computer models and image generators can free users from the constraints of physics—it is easy to generate a video of a talking animal, a floating loaf of bread, impossible physics, etc. Thus, by providing the appropriate instructions, an animation system can output a video sequence that is created entirely from the instructions and is thus not constrained by physical construction methods.

What computer graphics has done to movies, 3D printers have done to objects. Albeit with some constraints, it is possible to send a set of computer instructions to a 3D printer to print objects of arbitrary shapes, even some objects that would be otherwise impossible to create using manual techniques for object creation, such as mold casting, carving, milling, etc.

3D printers have been used to generate prototypes, models and curios, but have been limited in that while the ultimate shape of the object can be arbitrarily specified by a computer (or a user using a computer interface to the 3D printer), the object will be homogeneous because it is all made of whatever output material (resin, plastic, etc.) that particular printer uses. Of course, there is not total freedom, because some instructions might result in collapse of the object's parts if there is not enough support.

Some objects are elastically deformable and their interest as objects is that they have those properties. For example, a soccer ball that did not elastically deform would not be of interest as a soccer ball per se. Other examples include garments and shoes, furniture, plants, or even human or animal tissue. In both the animation context and in real-world object creation context, obtaining the correct object characteristics, determining characteristics of materials used and other characterizations are important to know. In animation, the problem is easier, since the behavior of virtual objects need not comply with the laws of physics, whereas physical objects do and their behavior is largely constrained to their construction—a virtual bouncing ball can be made of stone, but a physical object ball made of stone simply will not bounce.

Deformation effects can be modeled at very diverse scales, ranging from molecular interactions to globally-supported response functions, and through continuum elasticity laws or lumped-parameter models [Zohdi and Wriggers 2004]. As recently demonstrated by work in numerical coarsening and homogenization, the behavior of materials with microscale inhomogeneities can be approximated by mesoscale homogeneous materials [Kharevych et al. 2009].

In some 3D printers, there is one consumable material (rubber, plastic, resin, etc.) and the output objects are made of 100% of that consumable material. Recent developments, however, include multi-material 3D printers such as the OBJET™ Connex™ series 3D printers. These printers can "print" objects that include components made of a first material and components made of a second material, where the two (or more) materials vary in some parameter, such as density, elasticity, hardness, etc.

The computer graphics field has already contributed systems for designing and fabricating virtual clothes [Okabe et al. 1992], plush objects [Mori and Igarashi 2007], paper craft objects [Mitani and Suzuki 2004], or surface microgeometry [Weyrich et al. 2009].

What is needed is the ability to create deformable objects (or objects with other sets of characteristics) from computer instructions to match some desired user-specified characteristics. Of course, if the desired characteristics are the characteristics provided by the consumable material, the problem is simple, but often users will have more complex needs.

In the context of computer graphics, simulation of soft tissue using finite element models is known, as is data-driven modeling of deformable virtual materials. A recent survey of deformation models in computer graphics is shown in [Nealen 2006].

A popular approach for accurately modeling deformable materials in computer graphics uses continuum elasticity laws together with finite element modeling. This approach is capable of modeling a large range of materials, including those with nonlinear and heterogeneous deformation behavior. Typically, one must select a constitutive material model [Ogden 1997] that is capable of covering the range of behaviors of the material, and then, given a certain object and constitutive model, the material parameters are tuned in order to fit empirical data. This approach was introduced to biomechanical modeling in computer graphics by Terzopoulos et al. [1987], and it has been later applied to body parts such as the face [Koch et al. 1996; Magnenat-Thalmann et al. 2002; Terzopoulus and Waters 1993; Sifakis et al. 2005], the hand [Sueda et al. 2008], the neck [Lee and Terzopoulos 2006], the torso [Zordan et al. 2004; Teran et al. 2005; DiLorenzo et al. 2008] or the complete upper body [Lee et al. 2009]; to the simulation of fracture effects [O'Brien and Hodgins 1999]; or even interactive simulation after a model reduction step [Barbičand James 2005].

In order to achieve high realism, continuum elasticity approaches rely on complex processes involving accurate modeling of the geometry and fine tuning of parameters.

Several researchers have designed methods to automatically identify the parameters of constitutive models from measurements of real objects. These measurement-based modeling approaches cover the estimation of parameters such as Young modulus [Schnur and Zabaras 1992], both Young modulus and Poisson ratio together [Becker and Teschner 2007], non-linearly interpolated Young modulus and Poisson ratio [Bickel et al. 2009], plasticity parameters [Kajberg and Lindkvist 2004], or non-linear viscoelasticity parameters [Kauer et al. 2002].

Other measurement-based modeling approaches, instead of estimating local parameters, fit directly globally-supported functions as material description. Pai et al. [2001] introduced a system for capturing in a unified framework an object's shape, its elasticity, and roughness features. They used a Green's functions matrix representation [James and Pai 1999] in order to describe the deformation model. Later, others have extended the work of Pai et al. to increase robustness and handle viscoelastic effects [Lang et al. 2002; Schoner et al. 2004].

Recent work in computer graphics aims at modeling high-resolution heterogeneities even when the resolution of the discretization is considerably coarser [Kharevych et al. 2009; Nesme et al. 2009]. This process, known as homogenization, tries to find parameter values of a constitutive model sampled at low resolution such that the behavior of the object best matches the heterogeneous material. However, it is one thing to create an object seen only on the screen and another thing to create a physical object.

REFERENCES

[Barbič and James 2005] BARBIČ, J., AND JAMES, D. 2005. Real-time subspace integration for St. Venant-Kirchhoff deformable models. *ACM Trans. Graph.* 24, 3 (August), 982-990.

[Bathe 1995] BATHE, K. J. 1995. *Finite Element Procedures*. Prentice Hall.

[Becker and Teschner 2007] BECKER, M., AND TESCHNER, M. 2007. Robust and efficient estimation of elasticity parameters using the linear finite element method. In *Sim Vis*, 15-28.

[Bickel et al. 2009] BICKEL, B., BÄCHER, M., OTADUY, M. A., MATUSIK, W., PFISTER, H., AND GROSS, M. 2009. Capture and modeling of non-linear heterogeneous soft tissue. *ACM Trans. Graph.* 28, 3 (July), 89:1-89:9.

[DiLorenzo et al. 2008] DILORENZO, P. C., ZORDAN, V. B., AND SANDERS, B. L. 2008. Laughing out loud: Control for modeling anatomically inspired laughter using audio. *ACM Trans. Graph.* 27, 5 (December), 125:1-125:8.

[James and Pai 1999] JAMES, D. L., AND PAI, D. K. 1999. Artdefo—accurate real time deformable objects. In *Proc. of SIGGRAPH* 99, Computer Graphics Proceedings, 65-72.

[Kajberg and Lindkvist 2004] KAJBERG, J., AND LINDKVIST, G. 2004. Characterisation of materials subjected to large strains by inverse modelling based on in-plane displacement fields. *International Journal of Solids and Structures* 41, 13, 3439-3459.

[Kauer et al. 2002] KAUER, M., VUSKOVIC, V., DUAL, J., SZEKELY, G., AND BAJKA, M. 2002. Inverse finite element characterization of soft tissues. *Medical Image Analysis* 6, 3, 257-287.

[Kharevych et al. 2009] KHAREVYCH, L., MULLEN, P., OWHADI, H., AND DESBRUN, M. 2009. Numerical coarsening of inhomogeneous elastic materials. *ACM Trans. Graph.* 28, 3 (July), 51:1-51:8.

[Koch et al. 1996] KOCH, R. M., GROSS, M. H., CARLS, F. R., VON BUREN, D. F., FANKHAUSER, G., AND PARISH, Y. 1996. Simulating facial surgery using finite element methods. In *Proc. of SIGGRAPH* 96, Computer Graphics Proc., 421-428.

[Land and Doig 1960] LAND, A. H., AND DOIG, A. G. 1960. An automatic method of solving discrete programming problems. *Econometrica* 28, 3, 497-520.

[Lang et al. 2002] LANG, J., PAI, D. K., AND WOODHAM, R. J. 2002. Acquisition of elastic models for interactive simulation. *International Journal of Robotics Research* 21, 8, 713-733.

[Lee and Terzopoulos 2006] LEE, S.-H., AND TERZOPOULOS, D. 2006. Heads up!: biomechanical modeling and neuromuscular control of the neck. *ACM Trans. Graph* 25, 3 (July), 1188-1198.

[Lee et al. 2009] LEE, S.-H., SIFAKIS, E., AND TERZOPOULOS, D. 2009. Comprehensive biomechanical modeling and simulation of the upper body. *ACM Trans. Graph.* 28, 4 (August), 99:1-99:17.

[Lund and Stegmann 2005] LUND, E., AND STEGMANN, J. 2005. On structural optimization of composite shell structures using a discrete constitutive parameterization. *Wind Energy* 8, 109-124.

[Magnenat-Thalmann et al. 2002] MAGNENAT-THALMANN, N., KALRA, P., LÉVÊQUE, J. L., BAZIN, R., BATISSE, D., AND QUELEUX, B. 2002. A computational skin model: fold and wrinkle formation. *IEEE Trans. on Information Technology in Biomedicine* 6, 4, 317-323.

[Mikolajczyk and Schmid 2004] MIKOLAJCZYK, K., AND SCHMID, C. 2004. Scale & affine invariant interest point detectors. *International Journal of Computer Vision* 60, 1, 63-86.

[Mitani and Suzuki 2004] MITANI, J., AND SUZUKI, H.2004. Making papercraft toys from meshes using strip-based approximate unfolding. *ACM Trans. Graph.* 23, 3 (August), 259-263.

[Mori and Igarashi 2007] MORI, Y., AND IGARASHI, T. 2007. Plushie: An interactive design system for plush toys. *ACM Trans. Graph.* 26, 3 (July), 45:1-45:8.

[Müller and Gross 2004] MÜLLER, M., AND GROSS, M. H.2004. Interactive virtual materials. In *Graphics Interface* 2004, 239-246.

[Nealen 2006] NEALEN, A., MLLER, M., KEISER, R., BOXERMAN, E., AND CARLSON, M. 2006. Physically based deformable models in computer graphics. *Computer Graphics Forum* 25, 4 (December), 809-836.

[Nesme et al. 2009] NESME, M., KRY, P. G., JEŘÁBKOVÁ, L., AND FAURE, F. 2009. Preserving topology and elasticity for embedded deformable models. *ACM Trans. Graph.* 28, 3 (July), 52:1-52:9.

[Neumaier and Pownuk 2007] NEUMAIER, A., AND POWNUK, A. 2007. Linear systems with large uncertainties with applications to truss structures. *Reliable Computing* 13, 149-172.

[OBJET] OBJET. Connex500 Multi-Material 3D Printing System. http://www.objet.com/3D-Printer/Connex500/.

[O'Brien and Hodgins 1999] O'BRIEN, J. F., AND HODGINS, J. K. 1999. Graphical modeling and animation of brittle fracture. In *Proc. of SIGGRAPH* 99, Computer Graphics Proc., 137-146.

[Ogden 1997] OGDEN, R. W. 1997. Non-Linear Elastic Deformations. *Courier Dover Publications*.

[Okabe et al. 1992] OKABE, H., IMAOKA, H., TOMIHA, T., AND NIWAYA, H. 1992. Three dimensional apparel cad system. In *Computer Graphics (Proc. of SIGGRAPH* 92), 105-110.

[Pai et al. 2001] PAI, D. K., VAN DEN DOEL, K., JAMES, D. L., LANG, J., LLOYD, J. E., RICHMOND, J. L., AND YAU, S. H. 2001. Scanning physical interaction behavior of 3d objects. In *Proc. of ACM SIGGRAPH* 2001, Computer Graphics Proc., 87-96.

[Rebonato and Jäckel 1999] REBONATO, R., AND JÄCKEL, P. 1999. The most general methodology to create a valid correlation matrix for risk management and option pricing purposes. Tech. rep., Quantitative Research Centre, NatWest Group.

[Schnur and Zabaras 1992] SCHNUR, D. S., AND ZABARAS, N. 1992. An inverse method for determining elastic material properties and a material interface. *International Journal for Numerical Methods in Engineering* 33, 10, 2039-2057.

[Schoner et al. 2004] SCHONER, J. L., LANG, J., AND SEIDEL, H.-P. 2004. Measurement-based interactive simulation of viscoelastic solids. *Computer Graphics Forum* 23, 3 (September), 547-556.

[Sifakis et al. 2005] SIFAKIS, E., NEVEROV, I., AND FEDKIW, R. 2005. Automatic determination of facial muscle activations from sparse motion capture marker data. *ACM Trans. Graph* 24, 3 (August), 417-425.

[Sueda et al. 2008] SUEDA, S., KAUFMAN, A., AND PAI, D. K. 2008. Musculotendon simulation for hand animation. *ACM Trans. Graph.* 27, 3 (August), 83:1-83:8.

[Svoboda et al. 2005] SVOBODA, T., MARTINEC, D., AND PAJDLA, T. 2005. A convenient multi-camera self-calibration for virtual environments. *PRESENCE: Teleoperators and Virtual Environments* 14, 4 (August), 407-422.

[Teran et al. 2005] TERAN, J., SIFAKIS, E., BLEMKER, S. S., NG-THOW-HING, V., LAU, C., AND FEDKIW, R. 2005. Creating and simulating skeletal muscle from the visible human data set. *IEEE Trans. on Visualization and Computer Graphics* 11, 3 (May/June), 317-328.

[Terzopoulos et al. 1987] TERZOPOULOS, D., PLATT, J., BARR, A., AND FLEISCHER, K. 1987. Elastically deformable models. *In Computer Graphics (Proc. of SIGGRAPH 87)*, 205-214.

[Terzopoulus and Waters 1993] TERZOPOULUS, D., AND WATERS, K. 1993. Analysis and synthesis of facial image sequences using physical and anatomical models. *IEEE Trans. on Pattern Analysis and Machine Intelligence (PAMI)*14, 569-579.

[Zohdi and Wriggers 2004] ZOHDI, T. I., AND WRIGGERS, P. 2004. *Introduction to Computational Micromechanics*. Springer-Verlag New York, Inc.

[Zordan et al. 2004] ZORDAN, V. B., CELLY, B., CHIU, B., AND DILORENZO, P. C. 2004. Breathe easy: model and control of simulated respiration for animation. In 2004 *ACM SIGGRAPH/Eurographics Symposium on Computer Animation*, 29-37.

BRIEF SUMMARY

In embodiments of an object generation system and/or its component parts, consumable base materials are characterized in a characterization process wherein an object generation system can use a plurality of so-characterized base materials. Novel characterization processes are described.

Using the novel characterization processes, and/or conventional characterization processes, user input representing a desired object and set of characteristics for that desired object are processed in a novel manner, using a computer or computing device, to derive a mapping of locations for placement of portions of the plurality of base materials such that when the mapping is provided to an object generator, the generated object approximates the representing a desired object and set of characteristics.

In a specific embodiment, the characterization of a base material includes elasticity of the base material, the user input represents a desired shape for an object and a desired elasticity of all or portions of the object, the object generator is a 3D multi-material printer and the generated object at least approximates the desired shape and elasticity as a result of being constructed from the plurality of base materials used by the 3D multi-material printer.

The methods and apparatus described herein can be part of a 3D multi-material printer or might be used just to generate instructions, or a recipe, for generating a physical object with the desired set of characteristics. The desired set of characteristics of the object to be generated and the characteristics of the base materials might include one or more of density, elasticity, heat conduction, heat capacity, hardness, molecular behavior, and/or response to electromagnetic radiation. The recipe might be in the form that can be easily input and understood by one or more models of 3D multi-material printers, such as instructions for placing different blobs or layers of different base materials at different locations in the 3D space operated on by the 3D multi-material printer.

Calculating locations of a plurality of base materials might include searching a search space that represents combinations of base materials having differing characteristics, and determining a position (or positions) in the search space that optimize some metric, such as a threshold of average difference in characteristic over the object or the object surface. The search might be iterative and might involve pruning to simplify the search process. Pruning might involve pruning so that searching is not done in "impossible" areas of the search space (e.g., portions of the space corresponding to using a negative amount of material) or areas that would require operations not possible by a particular printing mechanism.

In other aspects, embodiments of a characterizing system according to aspects of the present invention can be used to characterize base materials. Where all variations of measurements of a base material is not practical, varying properties can be characterized from a subset of materials with those varying properties and other measurements not taken inferred from the measurements that are taken. For example, measurements can be taken for thicknesses T1, T2, T3 of material M and measurements for thicknesses T4 and T5 not taken, but calculated or inferred from the measurements taken at thicknesses T1, T2 and/or T3.

Operations performed to determine the recipe or to construct the desired physical object can be performed by hardware and/or software and functionality described herein might be embodied in computer-readable instructions stored on tangible media.

The following detailed description together with the accompanying drawings will provide a better understanding of the nature and advantages of the present invention.

BRIEF DESCRIPTION OF THE DRAWINGS

FIG. 12 is a table of error values for various models.

DETAILED DESCRIPTION OF THE INVENTION

Figure 1:
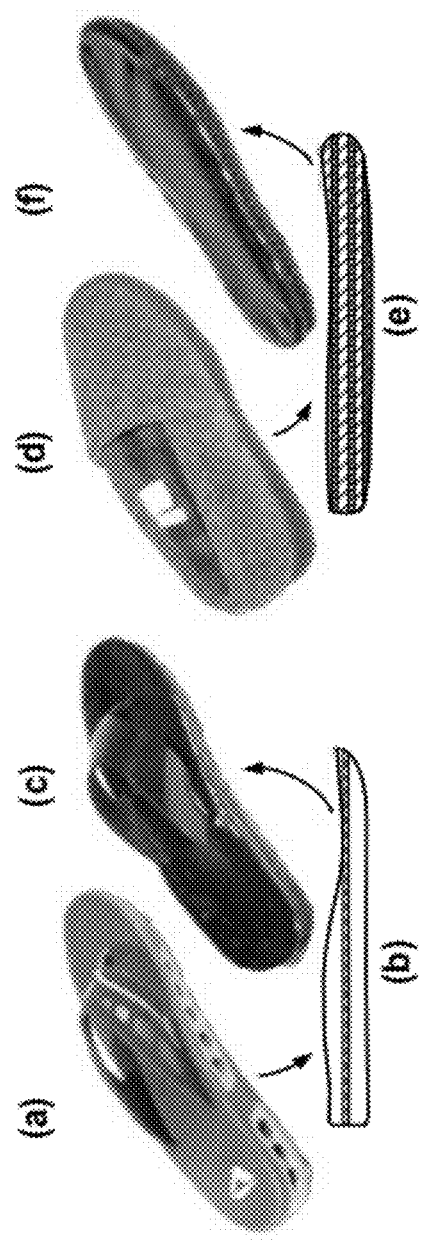
FIG. 1 illustrates examples of real and replicated objects.

Various embodiments of novel approaches to measuring characteristics of materials present, measuring characteristics of materials not present but inferred from measurements of characteristics of materials present, and determining a set of object generation instructions for a given desired set of object characteristics, are described. Measureable characteristics of materials also might include measurements of surface appearance characteristics such as color, translucency, texture, reflectivity, refraction, and the like. For example, as shown in FIG. 1, the flip-flop has various colors and reflections, e.g., a black shiny surface. Other measurable characteristics might include an object's taste, smell, and/or texture. For example, an apple has a taste and a smell.

Using these novel processes and/or apparatus and/or methods, objects can be designed by determining material descriptions and parameters such that the objects look and behave in a desired way. As explained herein, tests were performed to validate the simulation and material model by fabricating a number of different composite materials, measuring their deformations subject to a variety of different forces and comparing these measurements to the results of the simulation. The results are described below, following descriptions of operations of the various components.

FIG. 1 illustrates two examples of real and replicated objects, wherein the replicated object can be generated using a data-driven process to measure, simulate, and obtain material combinations of non-linear base materials that match a desired deformation behavior; as shown those objects can be "printed" with multi-material 3D printers using two materials with varying internal microstructure and surface characteristics. FIG. 1(a) is an image of a real physical object, in this case a rubber sandal. FIG. 1(b) is a data representation of the rubber sandal, in effect being a model of the deformation behavior of the rubber sandal. FIG. 1(c) is the corresponding object generated with a 3D printer (or equivalent device) using a plurality of materials with varying internal microstructure such that the deformation behavior of the printed sandal approximates that of the original rubber sandal. Likewise, FIG. 1(d) is an image of a slipper, FIG. 1(e) is a data representation of the slipper, and FIG. 1(f) is the corresponding object generated with varying internal microstructure such that the deformation behavior of the printed slipper approximates that of the original slipper. Additionally, the two materials can be chosen to provide a desired "look and feel" of the object. For example, the slipper in FIG. 1(f) was formed from a black material that has a corresponding shiny appearance resulting from the material's light absorbing and scattering capability. In other embodiments, for an object such as a printed apple, the material could be configured to provide the apple with an olfactory smell like an apple, or could be provided with a different smell or taste, such as that of strawberries.

As detailed below, a system for creating these objects might comprise a measurement system to measure characteristics of the object to be duplicated such as, deformation, ductility, elasticity, smell, taste, etc., and could be used to measure surface properties such as reflectivity, color, surface texture, translucency. For example deformation behavior of the objects to be duplicated, a measurement system to measure the deformation behavior of the plurality of materials to be used (this can be the same system that measures the objects, and/or parts or all of the information about the materials might be supplied in advance), a computational system that includes hardware and/or software to perform the calculations (described elsewhere herein) to determine patterns of the plurality of materials to use to duplicate (or make something not intentionally a duplicate) a measured object or the result of manipulation of the details of a measured object, and a 3D printer or equivalent that is coupled to the computational system so that instructions as to what material goes where (or what material is removed where) are provided to the 3D printer.

Thus, in operation, a user (who might be an end user, a designer, an artist, etc.) gets the deformation behavior, appearance, smell, taste, etc. of the target object and obtains a data set representing that deformation behavior and other characteristics of the object. The user (human or computer) can then modify the data set as desired, say so as to make an object that is not an attempt at a close copy, but has different characteristics than the original object. This data set can then be output to the printer to generate the generated object. Some of the steps can be automated using computer, or electronic or mechanical means.

The behavior, appearance, and composition of materials with microscale inhomogeneities can be approximated by mesoscale homogeneous materials, but one aspect of interest here is a process that can be regarded as the inverse of homogenization, i.e., achieving a desired large-scale behavior through appropriate combination of materials at a smaller scale. This can involve goal-based design of deformable models, and address the challenges of anisotropic, inhomogeneous, and non-linear behavior. It can go a step beyond computer animation of such objects and enable the physical fabrication of deformable objects with a desired look, feel, smell, taste and/or behavior.

Using techniques described herein, a process and representation for coarsening deformable objects with microscale inhomogeneous behavior is provided, which uses a data-driven approach and is capable of capturing non-linear behavior while maintaining runtime efficiency, as an extension of the linear numerical coarsening to non-linear material behavior. Also provided is a goal-based material design approach, usable in a computer, 3D printer or other electronics-based system, that approximates a desired mesoscale deformation behavior by microscale materials through combinatorial optimization. This is an inverse modeling approach, inverting the concept of homogenization. The result of such a design process can serve as input to a 3D multi-material printer for the actual physical fabrication of the deformable objects.

Figure 2:
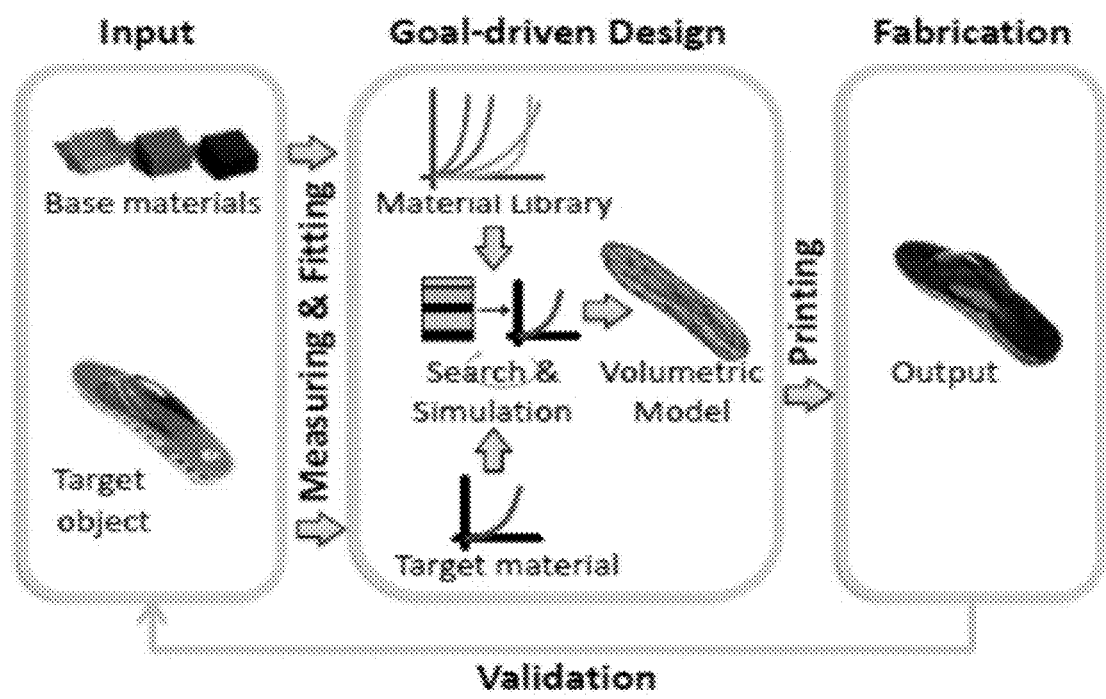
FIG. 2 illustrates an example of steps in a process of designing deformable materials with desired deformation behavior.

Our approach to measure, design, and fabricate materials with desired deformation behavior has a number of distinct steps, summarized in FIG. 2. As illustrated there, the base materials that the printer/fabricator has to work with are measured and characterized. This can be done ahead of time and stored as a materials library in electronically-readable storage. The object to be duplicated is then measured and through an iterative search and simulation process using the materials library, some volumetric model solution is attained that can be sent to the printer/fabricator. Then, the result can be validated against the original by various processes, such as human evaluation or machine evaluation. Validation could be part of a larger feedback loop.

In the illustrated search and solution result, the volumetric model comprises layers of different base materials. The search need not be constrained such that the cross-section is the same over the entire volumetric model, but a lateral line parallel to a surface of the output object might encounter different base materials. It may be that such variations are needed so that one part of the output object feels different than another part of the output object, but also might be used to find better solutions (e.g., closer volumetric models) than if there were a constraint that only solutions with constant layers of base materials are allowed.

In tests, a variety of base materials were considered. Some base materials can be formed as output objects of the printer by, for example, setting the printer to print out a cube of only one type of base material that the printer handles. An example printer is the Connex 500 multi-material 3D printer. In addition to using printer output as the base material, other base materials can also be obtained, such as a variety of standard foams, gels, and rubbers readily obtained that span a wide gamut of different deformations from very soft to very hard and rigid.

As part of the computation of a volumetric model to be generated for a given target object, a coarsening process is used to model the base materials using a data-driven, non-linear, stress-strain relationship of a Finite Element Method (FEM). This compact representation allows the computational system to determine, from deformations of base material samples, what the deformations might be of thicker or thinner versions of the base material samples. This allows for accurate prediction of deformations of arbitrary combinations of stacked base materials without having to do excessive numbers of measurements.

With that compact representation available, the computational system can design composite materials that best match a desired deformation behavior that, again, can come from a desire to match a target object or to match a virtual transformation of the target object. For example, the goal might be a volumetric model, given a set of base materials, that closely matches a target object that is measured as explained above, or the goal might be a volumetric model for an output object that is everywhere twice as large and 1.5 times as stiff as the target object.

In order to simplify the material design process in some embodiments, the computational system can be programmed to follow a goal-based optimization. In such optimization, the user specifies a desired material by providing example deformations and their corresponding forces, and the computational system automatically computes a best-matching composite material. Because the configuration space is combinatorial and exponentially large, in most cases, the computational system can be configured to run a truncated search process that prunes away states that yield poor matches to the desired material specifications.

Figure 3:
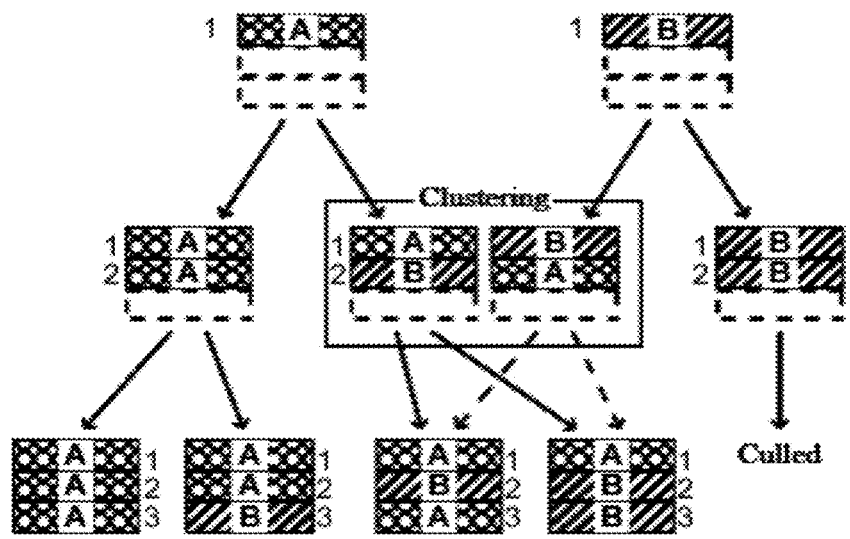
FIG. 3 illustrates an example of branch-and-bound with clustering.

FIG. 3 illustrates such an example of branch-and-bound with clustering. There, the root of the tree shows the two materials A and B for the first out of three cells. Each level of the tree spans the possible options for the subsequent cells. Sub-optimal branches of the tree can be culled and similar deformations can be clustered.

A typical use would be more complicated, but in this simplified example, there are three layers (1, 2 and 3) and two base materials (A and B) available. While the total space is eight possibilities, in this example, if is determined that if the top two layers are of material B, then it is not likely that any combination of additional layers below would provide the desired results. As a result, the "BB*" branches of the search tree are culled. Additionally, where it is determined that the "AB*" and "BA*" constructions would result in roughly the same effect, those two branches can be "clustered" and thus only one branch needs to be followed. In this example, there are only four branches to follow instead of eight.

There are conventional techniques for automatically identifying parameters of constitutive models from measurements of real objects and those techniques can be used, or borrowed, here. By restricting the types of materials to homogeneous ones, the models used by the computational system require far fewer degrees of freedom. Homogeneity of the base materials is not a limitation, since the volumetric model can represent inhomogeneity in the final output object by combining various homogeneous materials. If needed, the robustness of the fitting process can be increased by fitting one single non-linear model to all input examples simultaneously. In some cases, these features might not be required.

A first step of the design and fabrication process can be considered as a variant of homogenization, where the fine-scale inhomogeneous material is an actual physical material. In a second step, however, the opposite approach to homogenization is taken, generating a heterogeneous object that fits coarse force-deformation data from small-scale materials with known behavior.

Measurement System

Figure 4:
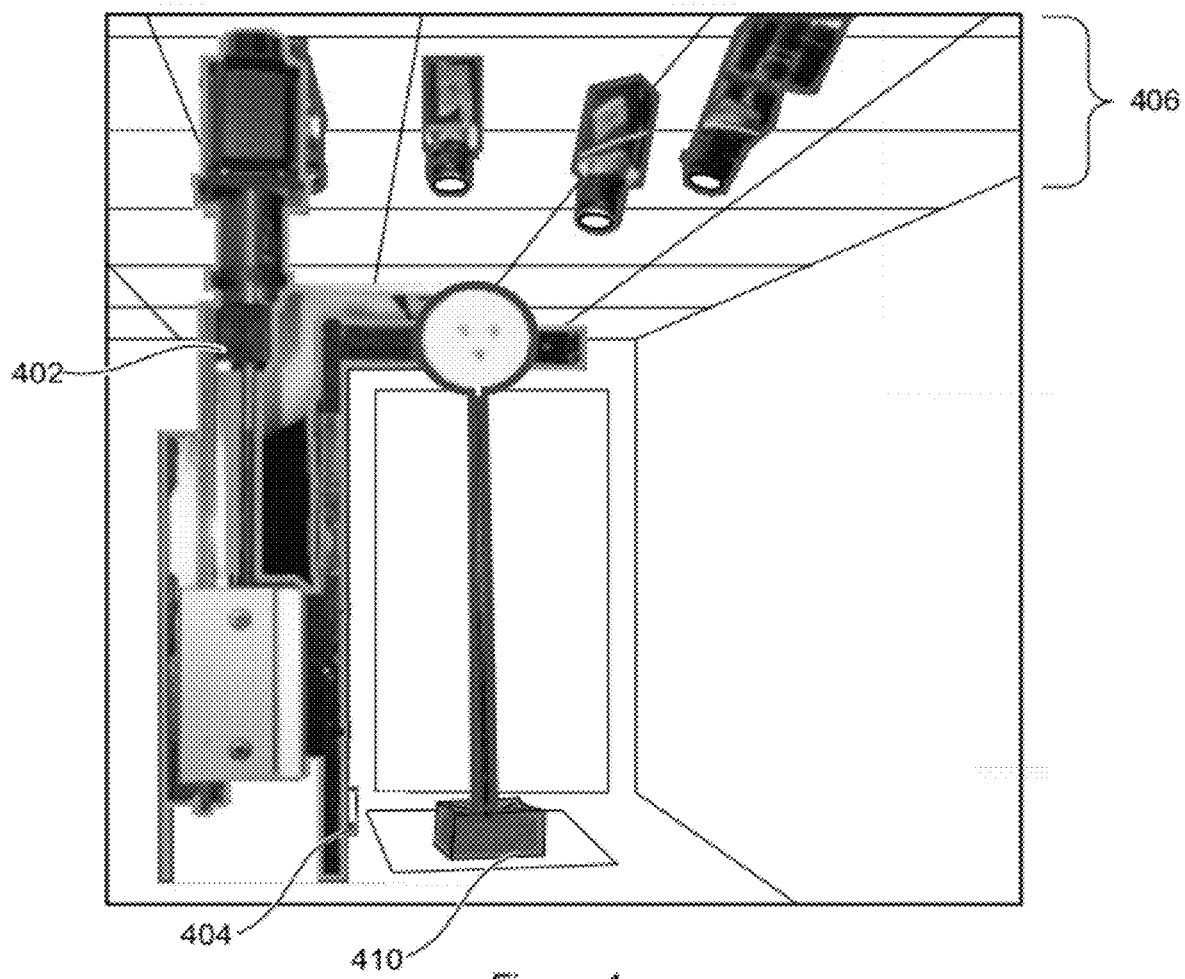
FIG. 4 illustrates components of a measurement system that might be used to measure the deformation behavior of objects to be duplicated (target objects), the deformation behavior of the plurality of base materials to be used, and/or to verify the deformation behavior of the printed object.

FIG. 4 illustrates components of a measurement system that might be used to measure the characteristics of objects to be duplicated (target objects), for example, the deformation behavior of the plurality of base materials to be used, and/or to verify the deformation behavior of the printed object.

In FIG. 4, the automated system for measurement of material deformations is shown comprising a robot arm 402, a force-torque sensor 404 and a vision subsystem 406 to track surface displacements on a test material 410. In a specific implementation, robot arm 402 might be a four DOF robot arm available from MicroProto Systems, force-torque sensor 404 might be a Nano 25 six-axis force-torque sensor available from ATI, and vision subsystem 406 might comprise seven cameras to track surface displacements. The base material might be painted or labeled with a registration pattern to assist with vision capture. In the specific implementation, the resolution of robot arm 402 was 0.003 mm and its repeatability was 0.01 mm, the maximum range of force-torque sensor 404 is 125 N with a resolution of $\frac{1}{24}$ N, and vision subsystem 406 included seven high-resolution Basler Pilot cameras running at a resolution of 1600×1200 pixels. Adapting the teachings of [Svoboda et al. 2005], the cameras might be oriented on a half-circle above the robot arm to minimize occlusions and use added diffuse lighting.

Non-Linear Material Model

Figure 5:
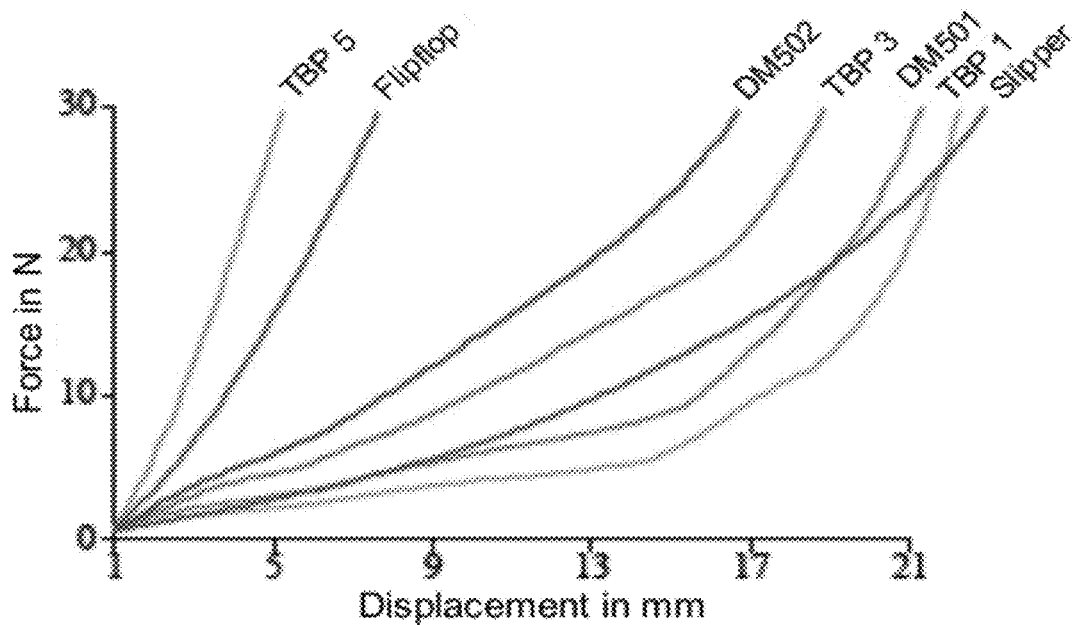
FIG. 5 is a graph of force-displacement curves for a subset of measured materials showing their nonlinear behavior.
Figure 6:
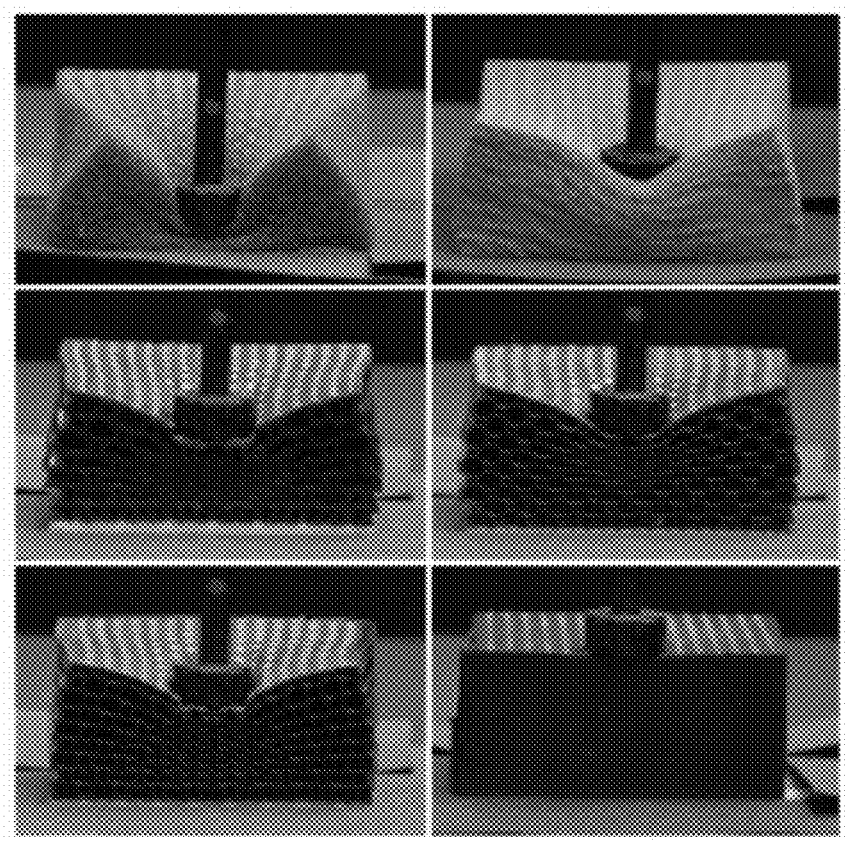
FIG. 6 illustrates base materials under 15 Newton force.

In some embodiments, the base materials might exhibit a non-linear, hyper-elastic stress-strain behavior, as demonstrated by the measured force-displacement curves in FIG. 5. Most of the base materials used comprise complex structures on a microscale level, which influences the deformation behavior significantly. Deformation behavior can vary, as illustrated in FIG. 6, which shows different materials under a constant (15 N) force. Other forces can be used, but this example shows the variability well.

In a data-driven approach, the non-linear behavior is captured by the measuring system using a non-linear interpolation of locally linear material properties obtained from example deformations of the base material at a mesoscale. Conceptually, this can be seen as a data-driven coarsening approach, representing the deformation behavior induced by microstructures on a mesoscale level.

To achieve this, the measurement system samples the stress-strain function of the material at a small set of strain values, and represents each stress-strain point by a linear co-rotational model, such as that shown in [Bickel et al. 2009]. In the deformed state at a given point in the material with an arbitrary strain value, the material is represented in the data structures locally by a non-linear interpolation of the sampled linear models.

Our linear FEM can use Cauchy's linear strain tensor. Given a displacement field u, the tensor can be defined as shown in Equation 1.

$$\epsilon(u) = \frac{1}{2}(\nabla u + \nabla u)^T)$$ (Eqn. 1)

The invariance of the strain under rotations can be obtained by the measurement system extracting the rotational part of the deformation gradient through polar decomposition, and then warping the stiffness matrix, in part using what is shown in [Müller and Gross 2004].

Thanks to symmetry of the strain and stress tensors, both can be represented in data structures as 6-vectors. Given a strain tensor, its equivalent 6-vector can be constructed as shown in Equation 2, and similarly for the stress.

$$\epsilon = (\epsilon_{xx}, \epsilon_{yy}, \epsilon_{zz}, \epsilon_{xy}, \epsilon_{xz}, \epsilon_{yz})^T$$ (Eqn. 2)

Then, a linear material can be represented by a 6×6 matrix, E, that relates the stress and strain vectors, as illustrated in Equation 3.

$$\sigma(u) = E \cdot \epsilon(u)$$ (Eqn. 3)

The non-linear behavior of the base materials can be represented by defining the stress-strain relationship, E, as a function of the local strain $\epsilon(u)$. The matrix E can be typically parameterized by a smaller set of parameters, p. Defining such parameters as a non-linear function of strain, therefore, the matrix E can be represented as a non-linear function E(p(u)). Although this approach holds for general anisotropic behavior, we describe below the parameters p for two types of materials that are most relevant in practice: isotropic and transversely isotropic ones. The transversely isotropic material is described below.

Paramterization of Isotropic Materials

For homogeneous linear isotropic materials, the matrix E can be represented by the two Lamé parameters $\lambda$ and $\mu$. In other words, the parameter vector is $p=(\lambda, \mu)$. Using Lamé's parameters, the stress and strain tensors are related as shown in Equation 4, from which the matrix E can be derived, in part possibly using what is shown in [Bathe 1995].

$$\sigma(u) = 2\mu\epsilon(u) + \lambda tr(\epsilon(u))I,$$ (Eqn. 4)

In homogeneous linear isotropic materials, the strain can be well captured by the three invariants of the symmetric strain tensor M$\epsilon$), $I_1(\epsilon)$, $I_2(\epsilon)$, $I_3(\epsilon)$. These invariants do not change under rotation of the coordinate system. Using the invariants to represent the strain, our non-linear material model can be considered as a 2-valued function in a 3-dimensional domain, as represented in Equation 5.

$$p(I_1, I_2, I_3): IR^3 \to IR^2$$ (Eqn. 5)

Parameterization of Non-Linear Material Properties

Given a base material, the computational system can work with a data structure representing its non-linear stress-strain relationship through a small set of P parameter vectors, $\{p_i\}$, corresponding to different strain values, $\{\epsilon_i\}$. Then, using the (parameter, strain) pairs as RBF centers, the computational system or measurement system can define the complete material behavior through RBF interpolation (see, for example [Bickel et al. 2009]) as represented in Equation 6.

$$p(\varepsilon) = \sum_{i=1}^{P} w_i \cdot \varphi(\|\varepsilon - \varepsilon_u\|)$$ (Eqn. 6)

Again, it should be understood that this description of the relationship can be done using a computer to process data from a memory or its inputs and output to memory or its outputs the suitable result and such steps can be performed with or without human intervention.

With homogeneous base materials, a single set of parameter vectors is sufficient to describe the behavior of an arbitrary object consisting of a single base material. This reduces the number of parameters of a base material to |p|·P, where |p| is the cardinality of the parameter vector (2 for isotropic materials, and 5 for transversely isotropic ones). In the examples here, the number of RBF centers is typically between P=6 for the isotropic foams and P=12 for printed materials with complex internal microstructure. Computing the RBF interpolation in a spatially varying manner, based on the local strain, allows the system to simulate different non-linear behavior in different regions of an object.

One approach to simulating the behavior of composite objects made of base materials, is the quasi-static FEM approach of [Bickel et al. 2009]. Given a simulation state, the computational system can compute the strain of all elements and perform a per-element computation of the parameter vector according to Equation 6. The computational system can then recompute the per-element stiffness matrices, and perform a new step of the FEM simulation.

Fitting Base Materials

We fit the properties of base materials such that simulated deformations match best a set of input examples. In the fitting process, values are needed for the RBF centers $\{\epsilon_i\}$ (i.e., strain values used as data points) and their corresponding weights, $w_j$ (to use, for example, in Equation 6). Let us first assume that the P RBF centers are known. Given a set of example deformations with measured displacements $\{\bar{x}_i\}$ and corresponding forces $\bar{F}_i$, the computational system computes the RBF weights w by minimizing the error in the displacements, according to Equation 7.

$$\hat{w} = \mathrm{argmin}\left\{ \sum_{i=1}^{n} \|x_i(p, F_i)) - \bar{x}_i\|^2 \right\}$$ (Eqn. 7)

In order to define the RBF centers, the computational system first fits the material as a homogeneous linear one and obtain a constant set of material parameters. Using these parameters, the computational system runs FEM simulations for all measurements, and records strain values and selects the RBF centers by sampling the strain space with P points that cover the range of measured values. Using these RBF centers, the computational system can fit the material parameters, but run several iterations to obtain a better coverage of the strain space.

An unconstrained optimization problem may lead to material parameters that are not physically correct. In the case of isotropic materials, it is easy to bound Lamé's parameters by computing the Young modulus and Poisson ratio and projecting these to physically valid values. In the case of transversely isotropic materials, there can be a constraint that the stiffness matrix is positive definite using the technique of [Rebonato and Jäckel 1999].

The measured forces $\overline{F}$ are normal to the surface. However, the contact area below the force probe also undergoes small tangential forces during the measurement process, and we found that these missing forces produce small fitting errors. The fitting quality can be increased by computing the missing tangential forces that would produce a perfect match at the probed surface points, and then reintroduce the tangential forces as known forces in the optimization process.

Test results are shown below, with an evaluation of the quality of the fit and reports error values comparing the simulation of fitted base materials to measured example deformations.

Goal-Based Material Design

Using the goal-based material design approach provided herein, it approximates a desired mesoscale deformation behavior by microscale materials through combinatorial optimization. Thus, the combination of the measurement system and the computational system can output directions to a multi-material 3D printer to generate printed output objects with the desired properties. One approach to getting to that output is to run an automated, or semi-automated, goal-based material design process.

Below is described an optimization process for obtaining composite structures made of a set of base materials. The process can be implemented using a computer and receives as input a description of the object surface, examples of desired force-displacement pairs, and a set of base materials with known deformation properties expressed in our non-linear material model.

Formulation of a Problem and Solution

Some considerations were taken into account to build or construct embodiments of a measurement/compute/construct system. Details of that will now be described.

The design process can be an optimization problem that chooses a distribution of M possible base materials inside the fabricated object such that it matches the input force-displacement examples. The problem can be made discrete by representing the desired object shape in a set of N regular cells, each made of a uniform base material. The desired inhomogeneity and possible anisotropy of the final object are achieved by the appropriate distribution of base materials. At each cell, one may choose a single material from M possible base materials. Herein, in context, a "design" refers to a collection of a certain choice of base materials and their distribution, often stored in an electronically readable data structure. A design can be represented as a vector $m=(m_1, m_2, \ldots, m_N)$, where $m_i$ is an integer value that indicates the type of base material in the i-th cell out of the $\{\overline{m} j, 1 \leq j \leq M\}$ possible base materials.

In order to test each design, we assigned its particular material choices to the cells of the object, simulated the object with the quasi-static FEM approach described herein using the user-specified force profiles, and measured the error in surface displacements. The surface displacements of all input examples are grouped in one large vector x. Given the goal displacements $\overline{x}$, the displacement error of a design is simply $\|x-\overline{x}\|$. Finding the optimal design with minimal displacement error is an exponential problem, with MN possible designs to be tested.

Branch-and-Bound with Clustering

One problem when solving such a design optimization problem is the non-convexity of the design space and therefore the risk of ending up with a local optimum solution if only the local neighborhood is observed [Lund and Stegmann 2005].

To solve this discrete optimization problem, the computational system can use a decision tree, such that at each level of the tree spans the options for one cell in the design. The root of the tree has M children, where each child represents one of the material choices for the first cell, while the other N−1 remain undecided. FIG. 3 illustrates a decision tree for an object with three cells and two possible material choices, as explained above.

Entire branches of the decision tree can be culled away using a branch-and-bound algorithm [Land and Doig 1960]. During tree traversal, we store the minimum error for the designs tested so far. When a new node of the tree is visited, i.e., a new cell is refined, we use this minimum error to cull (if possible) the complete subtree rooted at the node.

Given the breadth of the tree, branch culling can still lead to an intractable number of possible designs to be tested. However, often several designs produce similar deformation results. We can cluster these nodes together to limit the breadth of the decision tree at every level, and thus limit the number of designs to be tested.

Bound Estimation

Let us define as $\{m\}_a = (m_1, m_2, \ldots, m_l, x \ldots x)$ the designs rooted at a node a and located at level l. The first l cells are already determined along this branch, while the rest are still undecided (denoted by x). We estimate a bound on the deformations produced by $\{m\}_a$ by considering the cases where the undecided cells are uniform. In other words, to estimate bounds we fill the undecided cells with each one of the base materials $\overline{m}_j$, compute the resulting deformation for all input examples $x_j$, and then bound the result of the M cases as $[\overline{x}_j]$. We use axis-aligned bounding boxes in high dimensions as bounds, i.e., maximum and minimum values for each dimension of the resulting displacement vectors. We cull the branch rooted at node a if $\text{dist}(x, [\overline{x}_i]) < d_{min}$. When new designs are tested we update $d_{min}$ as appropriate.

The bound estimation approach is not conservative, due to material non-linearity and the existence of several non-monotonic functions along the simulation process. Recently, efficient methods for bounding displacements in linear FEM settings [Neumaier and Pownuk 2007] were presented, but practical bounds for non-linear settings are still challenging. However, the uniform blocks can be regarded as extreme behaviors (from very soft to very hard), therefore from these teachings, one can expect that combinations of these materials will produce in-between deformations, in which case our bound estimation will not cull optimal designs.

Clustering Strategy

We traverse the decision tree in a breadth-first manner, and hence a parent level with n nodes produces another level with $n \cdot M$ nodes. Evaluating bounds on this new level requires the computation of $n \cdot M^2$ designs. In order to limit the breadth of the tree, and thereby the total number of designs to be tested, we cluster nodes at every level before the splitting operation.

We cluster the n nodes at a level into K clusters using K-means clustering, using as distance dist(a, b) between two nodes the sum of squared example displacement differences evaluated for the pairwise uniform descendants. Formally, the distance metric is:

$$\text{dist}(a, b) = \sum_{j}^{M} \|x(m_{1_a}, \ldots m_{1_a}, \overline{m}j, \ldots, \overline{m}j) - x(m_{1_b}, \ldots m_{1_b}, \overline{m}j, \ldots \overline{m}j)\|^2 \quad \text{(Eqn. 8)}$$

The cluster representative is the node that is closest to the centroid of the cluster. Every time a level is split, only $KM^2$ designs need be tested. Since the height of the tree is equal to the number of cells N, this clustering strategy limits the total number of design evaluations to roughly $O(KM^2N)$. Note that the actual number of tested designs can be smaller due to bound-based culling. In some preferred implementations, K=20 clusters are used. This clustering approach comes at the cost of missing the global optimal solution.

Measurement and Base Materials

To acquire surface deformations of objects with a wide range of material properties, an automatic measurement system might be used to acquire details of many different materials with varying geometry and surface properties. An example system is described above. The system can be used to probe base material samples, combinations of base materials for model validation, complex objects to be reproduced, and their printed counterparts for validation purposes.

In some embodiments, the base materials are painted with marker dots on their surfaces. In one example, the dots are in a regular grid with 3 mm spacing. The marker positions can be extracted from images using a scale and affine invariant blob detector ([Mikolajczyk and Schmid 2004]) and tracked in all the frames. The number of deformation steps the system performs might be from 30 to 200 deformation steps depending on the stiffness of the material. The maximal forces might be in the range of 35 to 50 N. The tracked markers and corresponding forces can be registered to a surface mesh.

In an example with isotropic base materials, the OBJET™ Connex™ 500 multi-material printer was used in a series of runs. In each run, the printer can use up to two different materials, e.g., Vero White (rigid) and Tango Black Plus (soft). The printer can also mix these two materials in predefined proportions producing isotropic materials of intermediate stiffness. In specific runs, we mainly used Tango Black Plus (TBP) and a mixed material called digital material with shore 50 (DM50). In addition to these two isotropic base materials, we additionally measured eight isotropic materials from the McMaster-Carr online catalog, including rubbers and foams. FIG. 5 shows a plot of surface displacement as a function of applied force for a subset of measured materials.

Figure 13:
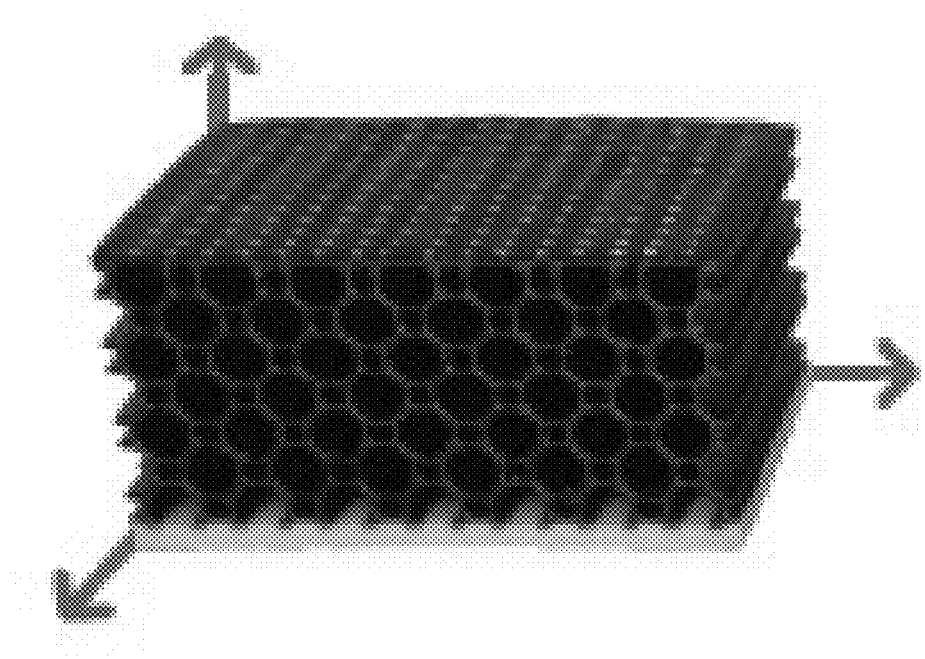
FIG. 13 illustrates transversely isotropic base materials, made from tubes of varying sizes and distributions.

Transversely isotropic base materials might be needed in order to model and fabricate materials with even larger deformation gamut (in particular, materials that are much softer). This can be addressed by having internal empty spaces as an option for the printed objects. In some printers, empty spaces are only allowed if they span the entire object along the z-axis. In such cases, tubes of varying sizes and distributions can be used, as is illustrated in FIG. 13. There, perhaps only two tube sizes are used, but more tube variation is also possible. These objects are isotropic in the horizontal plane, perpendicular to the tube direction. The material can be regarded as transversely isotropic. Where other 3D printers are used that do not have these limitations, more flexibility might be obtained.

For such materials, the matrix E can be represented as shown in Equation 9, with five degrees-of-freedom, {E11, E12, E13, E33, E44}. The non-linear material model can then be considered as a five-valued function in a six-dimensional strain domain, as shown in Equation 10.

$$E = \begin{bmatrix} E11 & E12 & E13 & 0 & 0 & 0 \\ E12 & E11 & E13 & 0 & 0 & 0 \\ E13 & E13 & E33 & 0 & 0 & 0 \\ 0 & 0 & 0 & E44 & 0 & 0 \\ 0 & 0 & 0 & 0 & E44 & 0 \\ 0 & 0 & 0 & 0 & 0 & \frac{(E11-E12)}{2} \end{bmatrix} \quad \text{(Eqn. 9)}$$

$$p(\varepsilon): IR^6 \rightarrow IR^5 \quad \text{(Eqn. 10)}$$

All base materials were printed as 4 cm (width)×5 cm (length)×2.5 cm (height) blocks. The deformations (side view) of some of these materials under 15 Newtons force are shown in FIG. 6.

Validation and Results

Figure 7:
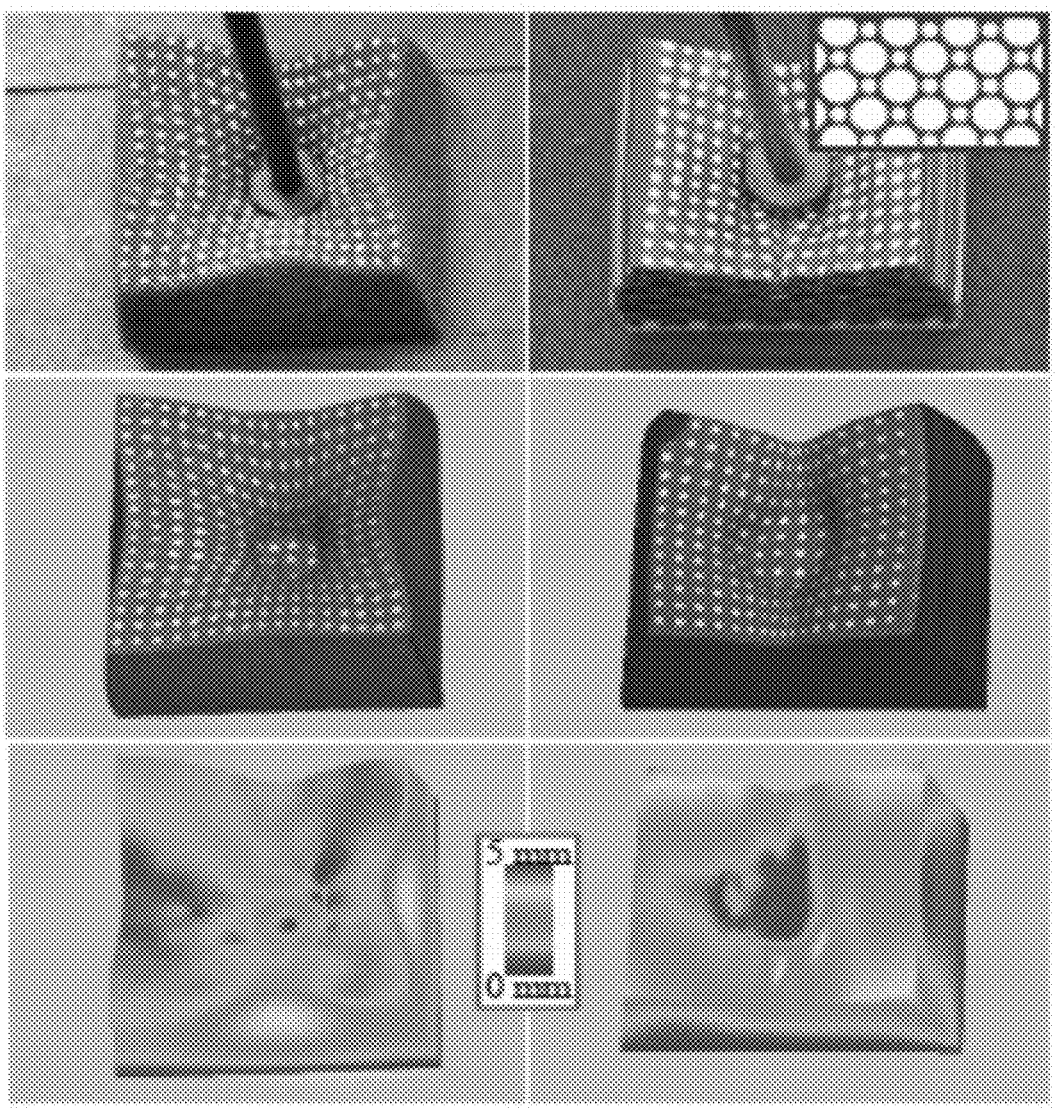
FIG. 7 illustrates a side-by-side comparison of real and simulated materials.

FIG. 7 illustrates a side-by-side comparison of real and simulated materials. The material models represent elastic behavior of the base materials at the mesoscopic level very well. In FIG. 7, deformation of an isotropic (left column) and transversely isotropic material (right column) compares acquisition from an actual object (top row) with the simulation based on FEM (middle row) and the displacement error (bottom row). Note that the error is only evaluated at the surface marker positions and then interpolated for visualization purposes. Furthermore, the error evaluation is dependent on the accuracy of the measurement system which is in the range of <1 mm. Very small pitching effects at the microscale of the material might not be trackable and are therefore might be missing in an error visualization. Other systems can be used if that is important.

For isotropic base materials, we used six RBF centers and, for the transversal isotropic base materials, we used 12 RBF centers, resulting in 12 and 60 parameters for each base material, respectively. The fit to the material model takes two hours on average but has to be performed only once. FIG. 12 shows the average, standard deviation, and maximum errors for the materials under varying applied loads.

Validation of the Stacking Next, we show that we can accurately predict the behavior of composite materials made from arbitrary combinations of base materials. We ran a number of simulations for different composites and also fabricated those using the Connex 500 printer. Next, we measured the behavior of these composite materials using our system and compared them to their corresponding simulations.

Figure 8:
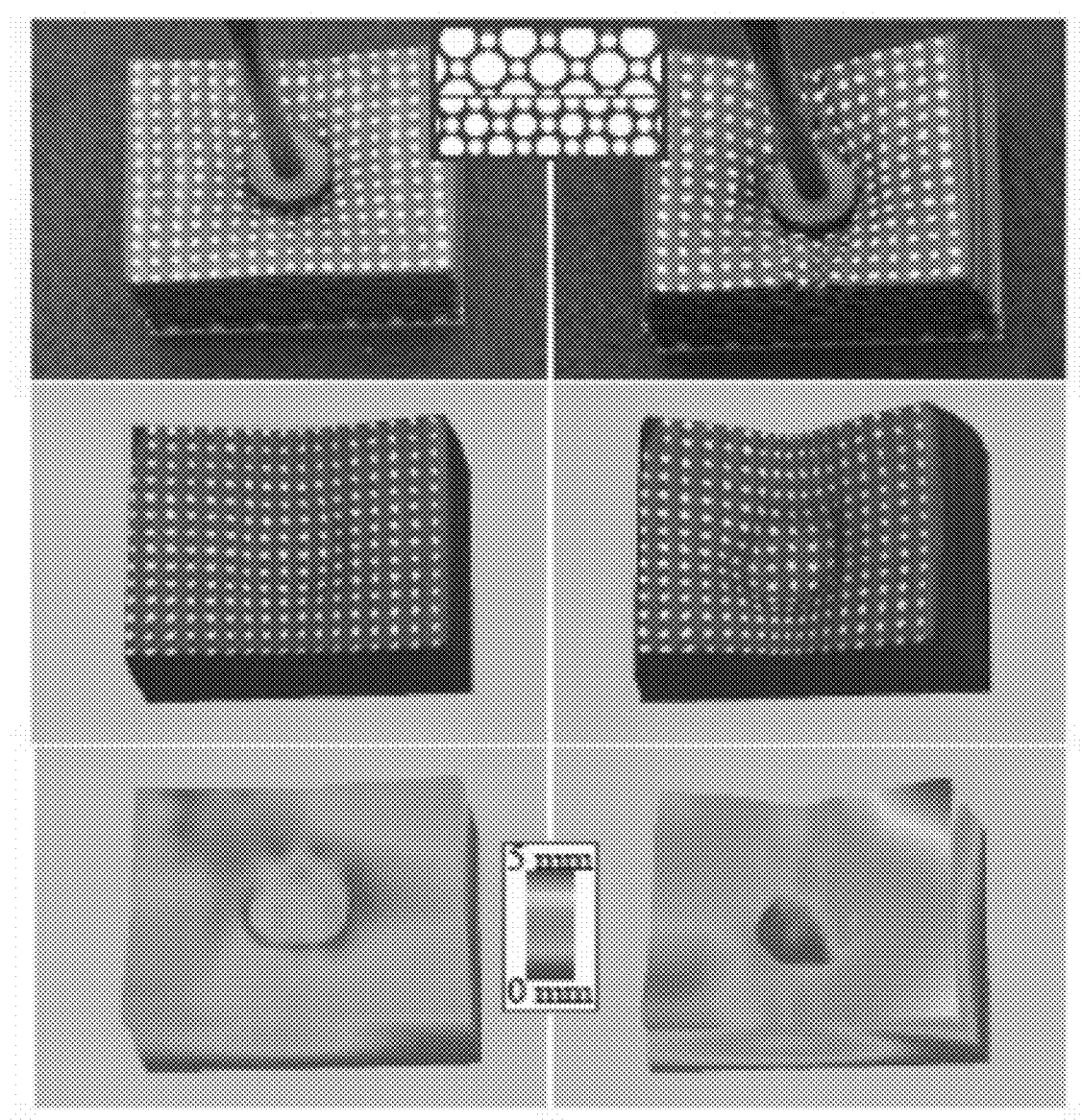
FIG. 8 illustrates results of a validation of composite materials.

FIG. 8 illustrates results of a validation of composite materials, wherein the material properties obtained from two independent fits of base materials (DM501 and DM502) are assigned to a composite material comprising two layers and printed, then the deformations of the real object (upper row) to the simulation (middle) under a load of 8 and 21 Newton were compared. The lower row is an error simulation. In the composite example shown in FIG. 8, the average errors are 1.98 mm and 2.16 mm under loads of 10 N and 20 N.

Validation of the Goal-based Design Next, we validate our goal-based design process. As the first step, we tested it on materials that we knew were reproducible. We picked a given combination of layers and their thicknesses. Then we simulate this composite material and use its deformations as the input to the search algorithm.

Figure 9:
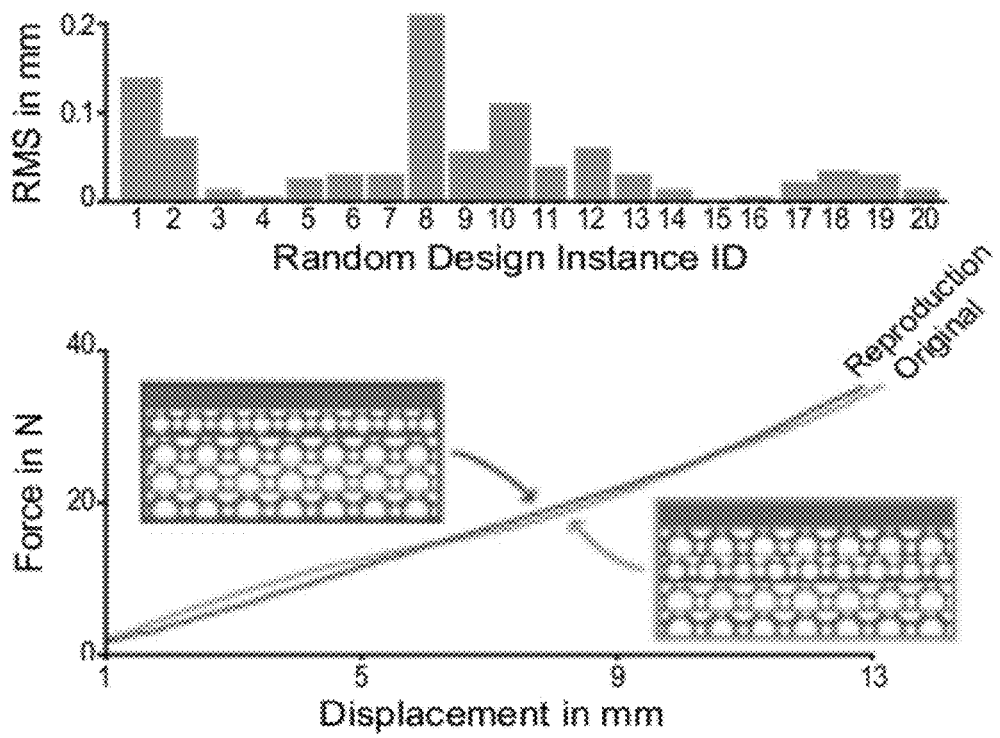
FIG. 9 are graphs showing validation of goal-based design algorithm.

FIG. 9 are graphs showing validation of a goal-based design process. Based on a randomly generated set of material designs, these designs were simulated and their simulated deformations were the input to the goal-based design search process. FIG. 9 shows a comparison of the obtained designs of the search algorithm with the known ground work. The upper bar plot shows the RMS error. Upon fabricating one of those randomly generated designs and its corresponding search output, their force-displacement curves are compared.

This strategy was tested on 20 different randomly chosen material designs (5 layers, each with 9 different material choices). Although a search does not guarantee finding a global optimum, the search always finds a very close solution (average RMS error of 0.067 mm). To carry this validation even further, we have fabricated these composites and remeasured their properties. We show these results also in FIG. 9.

Figure 10:
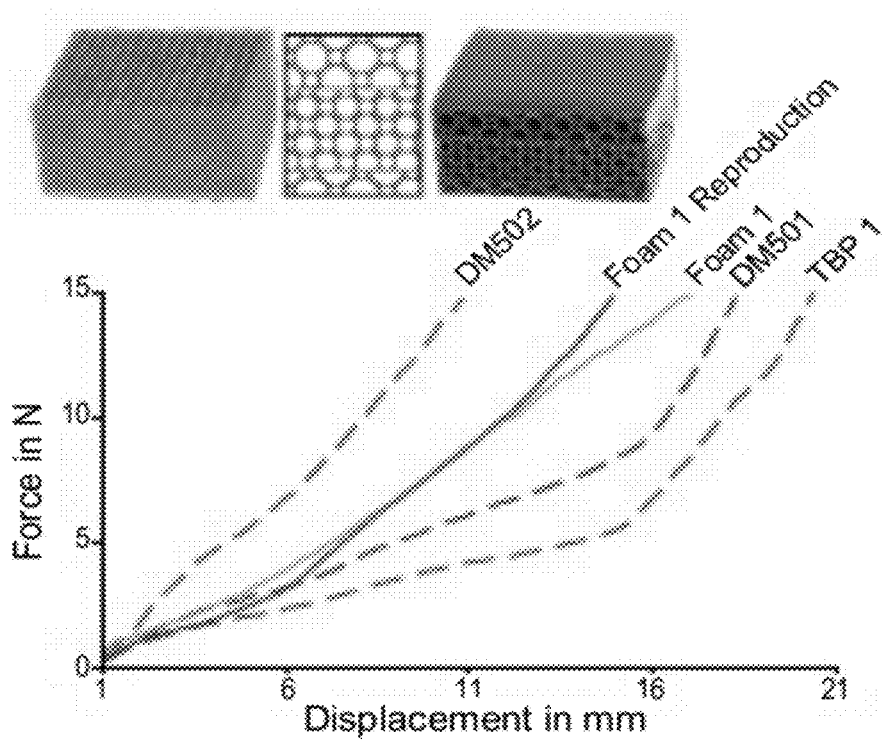
FIG. 10 illustrates a fabricated example of goal based design and the obtained spatial combination and the error evaluation.

FIG. 10 illustrates a fabricated example of goal based design and the obtained spatial combination and the error evaluation, resulting from an attempt to approximate one of the foams with a combination of materials printed using the Connex 500. As an input to the goal-based material design process, three example deformations of a foam were specified (upper left). The desired deformation behavior is approximated by finer scale materials obtained through combinatorial optimization and then fabricated using a 3D printer (upper right). The lower curve shows the force-displacement relationship of used base materials foam, and fabricated approximation.

Replicating Objects

Figure 11:
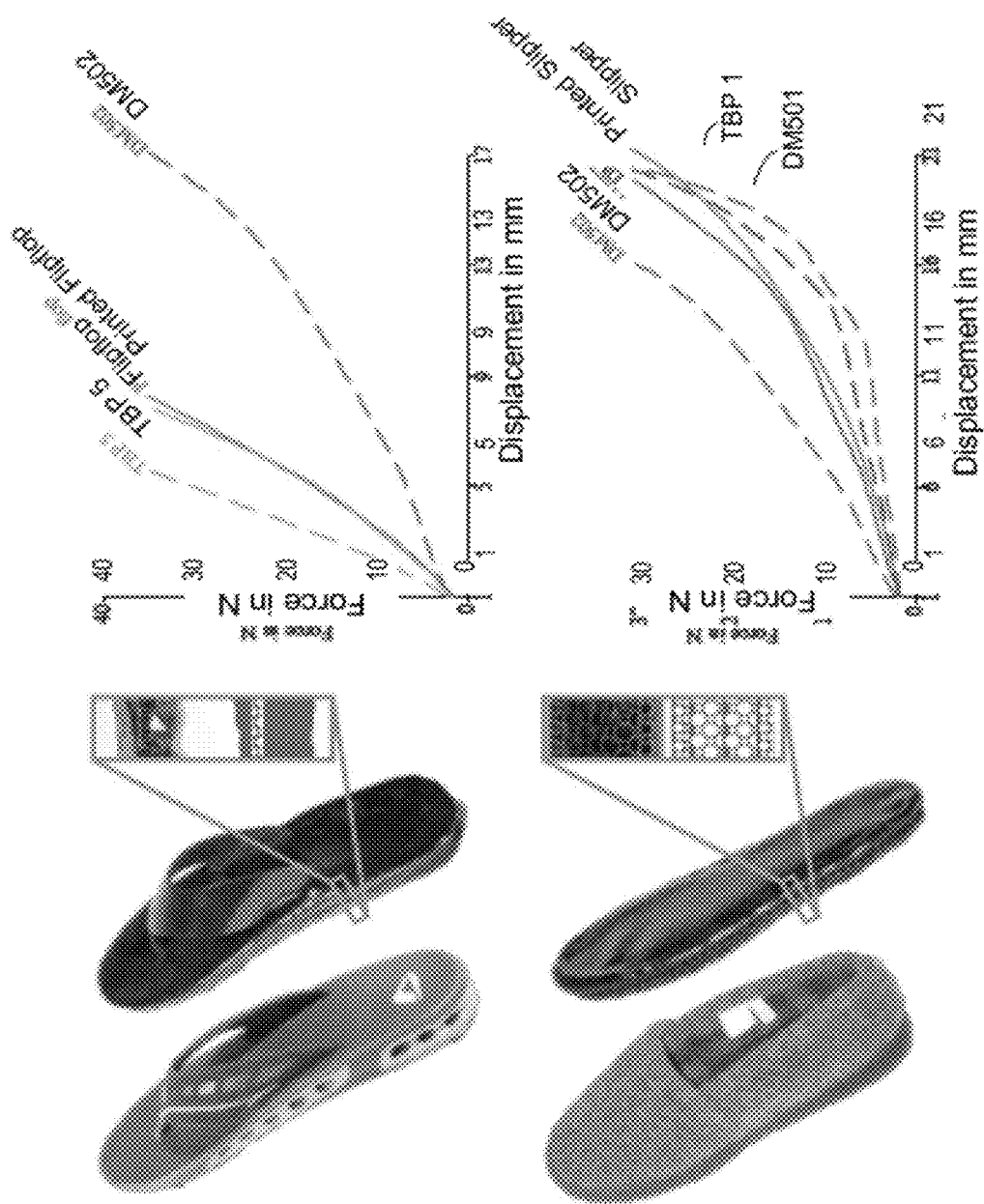
FIG. 11 shows show force-displacement curves for corresponding points on replicas and original objects.

For the most complex results, we try to showcase the whole process by replicating objects with complex deformation behavior. In particular, we reproduced a beach flip-flop and a felt slipper. We used a Cyberware scanner to scan the 3D geometry of each of the objects. Then, we acquired the deformation behavior of each object using our measurement system. Next, we used the goal-based design process to find the best approximation of the material deformation properties using our base materials. Finally, we printed replicas of these objects using the multi-material printer. As can be seen in FIG. 11, the replicas show very similar behavior to the original objects. To further validate this approach, we show force-displacement curves in FIG. 11 for the corresponding points on the replicas and the original objects.

The process illustrated by FIG. 11 is replicating a flip flop (upper row) and a slipper (lower row). The left column shows the original images, the middle row shows the replicated object with the spatial combination of base materials obtained by the goal-based optimization process. As shown, the replication matches the deformation behavior of the original quite well, indicated by the force displacement plots (right column) for a corresponding point on the original and replica. The dotted curves characterize the base materials.

FIG. 12 is a table of error values. This data resulted from a fitting of parameters for various isotropic (soft/medium/hard foams) and transversely isotropic (printed materials with cylinder hole structures) materials. The surface displacement error under small, medium, and high force loads are shown and were done by measuring and comparing deformations of material blocks of 5×5×2.5 cm (for isotropic) or 5×4×2.5 cm (for printed materials).

Figure 14:
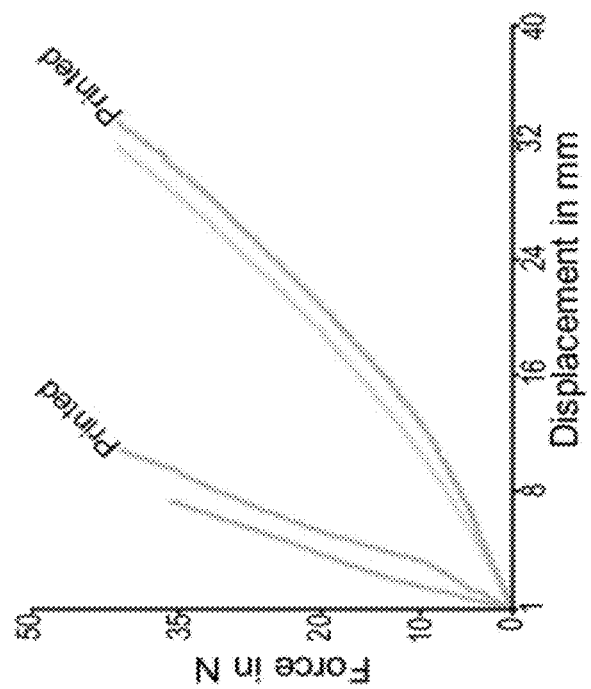
FIG. 14 illustrates parameters for a leather stool, including show force-displacement curves for corresponding points on replicas and original objects.
Figure 14:
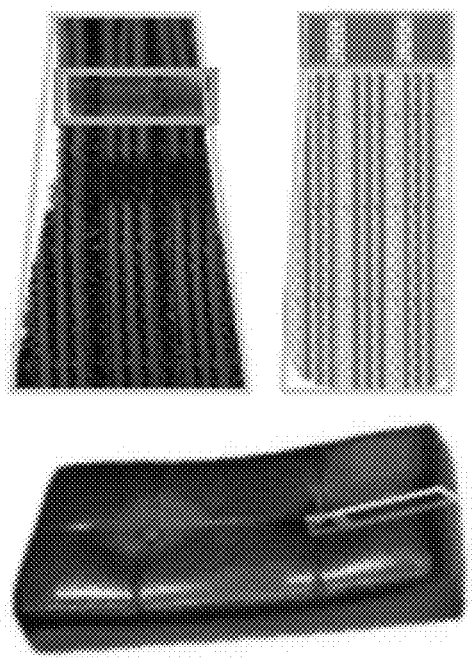

FIG. 14 illustrates parameters for a leather stool, including show force-displacement curves for corresponding points on replicas and original objects. The left column shows the original object, the middle column a cross section of the replicated object and the spatial combination of base materials. In this example, the stool was segmented into two regions, a stiff region below the button and the remaining softer region. This deformation behavior is validated by comparing the force displacement plots (right column) in the button region as well as in the softer region.

Example Hardware for Computational System

Figure 15:
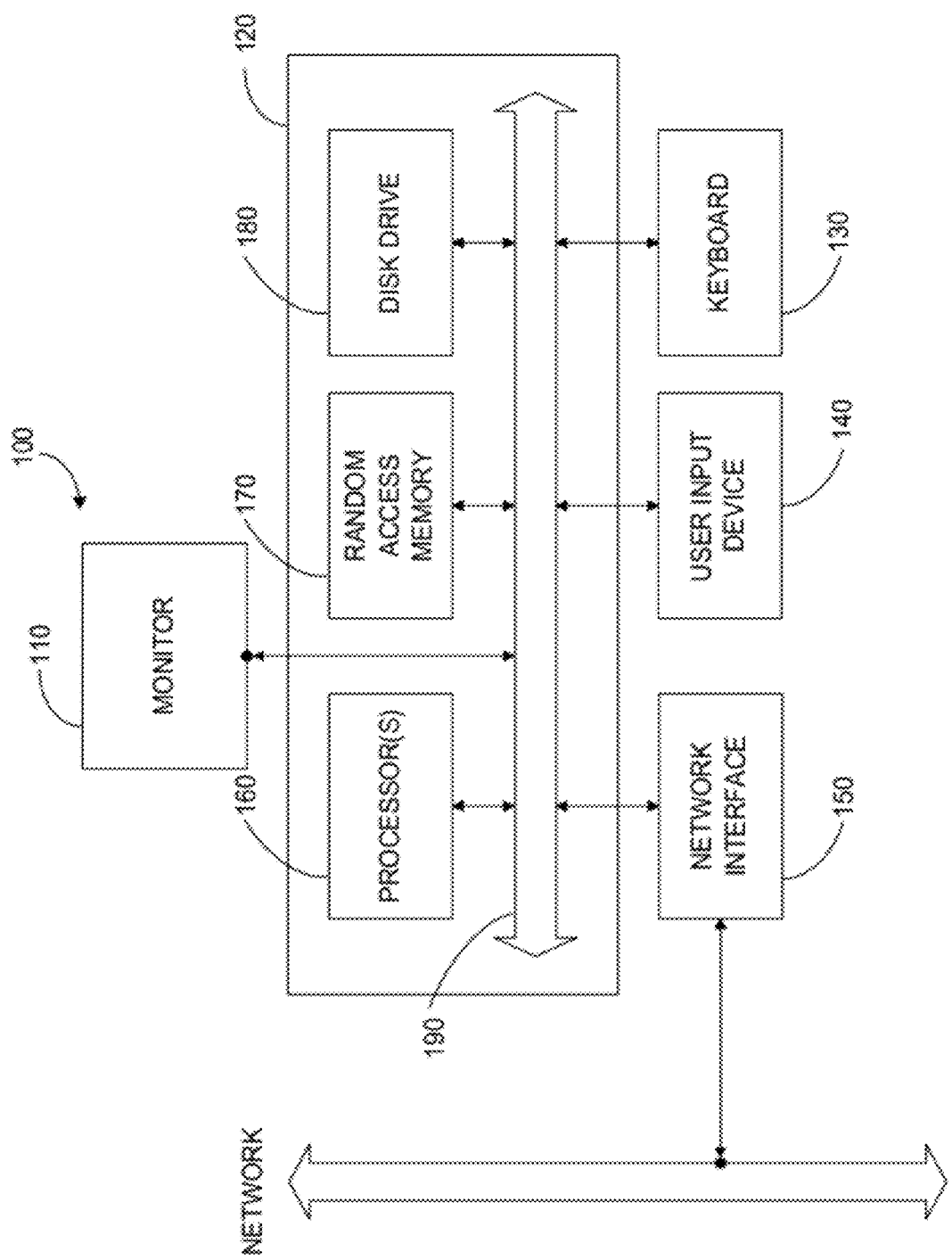
FIG. 15 illustrates an example hardware system that might be used for the computational system and/or for performing techniques described herein.

FIG. 15 illustrates an example system 100 for performing computations described herein. A person of ordinary skill in the art, after reading this disclosure, should be able to configure and/or program a computer to perform various calculations and operations as described herein without undue experimentation.

In the example shown, computer system 100 typically includes a monitor 110, computer 120, a keyboard 130, a user input device 140, computer interfaces 150, and the like. In some cases, the operations are entirely automated and some I/O devices are not needed. In some embodiments, the computation process is built into the same computer as the measurement process and can be directly coupled, via wires or wirelessly, to mechanical elements, such as robot arms, that are part of the measurement process, and to a printer, in order to print the objects per the computation output.

In various embodiments, display/monitor 110 (if used) may be embodied as a CRT display, an LCD display, a plasma display, a direct-projection or rear-projection DLP, a microdisplay, or the like. In various embodiments, monitor 110 may be used to visually display images, or the like, as well as being part of an interactive environment.

In the present embodiment, user input device 140 is typically embodied as a computer mouse, a trackball, a track pad, a joystick, wireless remote, drawing tablet, voice command system, eye tracking system, and the like. Embodiments of network interface 150 typically include an Ethernet card, a modem (telephone, satellite, cable, ISDN), (asynchronous) digital subscriber line (DSL) unit, FireWire interface, USB interface, and the like. For example, network interface 150 may be coupled to a computer network, to a FireWire bus, or the like. In other embodiments, network interface 150 may be physically integrated on the motherboard of computer 120 and/or include software drivers, or the like.

In various embodiments, computer 120 typically includes familiar computer components such as a processor 160, and memory storage devices, such as a random access memory (RAM) 170, disk drives 180, and system bus 190 interconnecting the above components. RAM 170 or other memory might hold computer instructions to be executed by one or more processors as a mechanism for effecting some functionality described herein that is implemented in software. In one embodiment, computer 120 includes one or more Core™ microprocessors from Intel. Further, in the present embodiment, computer 120 typically includes a UNIX-based operating system.

RAM 170 and disk drive 180 are examples of computer-readable tangible media configured to store embodiments of the present invention including computer-executable code implementing techniques described herein, data such as image files, object models, representational data, conversions from models to printer instructions, procedural descriptions, executable computer code, and/or the like. Other types of tangible media may include magnetic storage media such as floppy disks, networked hard disks, or removable hard disks, optical storage media such as CD-ROMS, DVDs, holographic memories, and/or bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 15 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™, Pentium™ or Itanium™ microprocessors from Intel; Turion™ 64 or Opteron™ microprocessors from Advanced Micro Devices, Inc; and the like. Further, other types of operating systems are contemplated, such as Vista™ or Windows XP™ or the like from Microsoft Corporation, Solaris™ from Sun Microsystems, Linux, Unix, or the like.

In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

Generalized Approach

Several detailed examples are provided above, but it should be understood that the invention is not limited to the specific examples. In general, given N materials with measured properties, an electronic/mechanical/computing system is able to design and fabricate a composite (layered) material with desired properties, e.g., deformation, elasticity, ductility, sponginess, softness, taste, smell, surface color, surface reflectivity, surface, translucency, surface, texture such as fur, leather, etc.

A first portion of the system is the measurement system, that can perform automated measurements of surface deformation subject to a given force, resulting in a representation that is a data-driven stress-strain function. Then, given N stacked materials with known stress-strain functions and known thicknesses, a strain-stress function for a combined material can be derived, often using a search process that does branch-and-bound searching.

Then, given a desired stress-strain function, a computational system can output material layers and their thicknesses to a printer that best approximate the desired function. With discrete/combinatorial optimization, each material has one of M thicknesses (e.g., 1, 2, 3, . . . , M mm) and the problem is a combinatorial search problem (e.g., try all possible combinations) with efficient search strategies (e.g., to prune out invalid solutions quickly). From this, the space of possible outputs can be described (e.g., given a set of materials with known strain-stress functions, what is the space of all possible strain-stress functions that can be obtained by stacking these materials?)

The types of materials used as the base materials can be homogenous materials (wherein each layer is uniform) or heterogeneous materials (wherein each layer can have spatial variations). Strain-stress functions can be spatially varying (e.g., different for each surface point). Materials can be fabricated using a mixed material printer. If some strain-stress functions cannot be reproduced physically, design output mapping processes cane be used that preserve relative differences between deformation properties rather than their absolute values.

Sample applications of such a system might include fabricating a material that deforms exactly like human skin, or animatronics. This might also be used for character masks (an older actor, a different person). Another application is fabricating a soft-tissue material that deforms exactly like a more expensive material but is significantly cheaper, lighter, etc.

Further Discussion

As described above herein, the characteristics of the base materials that are determined (e.g., by measuring some characteristics of some base materials and inferring the rest) and the desired characteristics of the physical object to be created can be elasticity. In such cases, for example, a designation of where to place base materials having different elasticities in order to construct the physical object to have, at least approximately the desired elasticity behavior can be determined by a search of a search space representing different combinations of elastic base materials. However, the characteristic need not be limited to elasticity, but might relate to weight distribution, heat conductivity and/or other characteristics described herein.

In the descriptions of embodiments herein, a complete system is described to taking multi-material 3D printer consumables, characterizing them, determining the desired characteristics of an object to be generated, computing which of the consumables to use where, and then using those consumables in the computed locations to generate, at least approximately, a physical object having the desired properties. It should be understood that not all of these aspects of the present invention are needed in all implementations. For example, a system might be used just for generating instructions for making the physical objects. An invention might also comprise a physical object generated using novel techniques described herein, apart from an apparatus that was used to generate the physical object. A system might generate physical objects after receiving the computation results and the computation results might be developed without separate measurements of the input consumable materials (because the characteristics are already measured and known, or because they were simulated or estimated, etc.).

Herein, a novel process for computing a "recipe" for a real, physical material with desired scattering properties is described. In a specific example, given N base materials (each with a measured profile) and a desired material (specified by a profile) for the output, a processor (e.g., computer, computing device and/or electronic circuit) computes a "stacking" of these base materials (number of layers, thickness of each layer, and base material assignment for each layer) that best approximates the desired material (i.e., its profile). As explained elsewhere herein, the same approach can be used for other base material and desired material characteristics/properties.

As has now been explained, physical objects can be generated from digitized descriptions using a machine capable of placing or fixing material at locations with a plurality of materials that can be placed or fixed, by determining properties for each of the materials, a desired shape for the physical object, desired properties for a portion of a surface of the physical object, calculating a set of construction instructions, based on determined properties for the materials, the desired shape for the physical object and desired properties for the physical object, and generating the physical object or outputting instructions for generating the physical object, such that when the physical object is generated, it will have, at least approximately, the desired shape, and properties such as taste, smell, softness, elasticity, surface reflectivity, surface color, surface translucency, and the like.

Shown herein, we presented a complete approach for measuring, designing, and fabricating materials with desired deformation behavior. Our model is able to represent and simulate the non-linear elastic deformation behavior of objects with complex internal microstructure. In order to ensure a good match between deformations of real materials and their simulated behavior, we used a data-driven measurement process to estimate nonlinear stress-strain models for each material. Furthermore, we showed that a goal-based material design approach can approximate a desired global deformation behavior by finer scale materials through combinatorial optimization. By closing the loop between measurements, simulation, goal-based material design, and printing, we validated the complete pipeline and showed that close matches between simulated and real fabricated objects can be achieved. Our goal-based design can provide for 3D hardcopying.

Variations might include using this process as a template for many future systems that expand the range of simulated and fabricated material properties (such as dynamic deformation properties or plasticity). The model might be extended, using the teachings herein, to dynamic and plastic deformation behavior and improved measurement such that it could acquire a wider range of deformation properties (e.g., material stretching and dynamic deformation measurements) or could guarantee and incorporate prior physical knowledge, such as volume preservation.

In other variations, strategies can be provided for optimally choosing the number of degrees of freedom (RBF centers) of our material model, striking a balance between accuracy and overfitting. Also, material homogenization strategies can be provided to improve the speed of the forward (simulation) step for non-linear materials. This improvement along with more advanced search strategies could, in turn, speed up the inverse step to allow for design and fabrication of extremely complex heterogeneous materials.

In some extensions, instead of printing layers of different materials, this could be extended in a straightforward manner to arbitrary spatial combinations (e.g., voxels) of base materials. Future 3D multi-material printers might be able to use many more base materials with even more varied properties and these teachings are extensible to future printers.

It should be understood that where this disclosure describes that "we" take an action or the action is done by "us", it is contemplated that the action that was taken can be done by another system, such as an automated design system, and/or as part of a process in the physical world, in a computer memory or part of an electronic process, standing alone or as part of a larger systems. Of course, some steps might be performed by a human, but many can be done with electrical, electronic or computer apparatus and might be done without human intervention.

Further embodiments can be envisioned to one of ordinary skill in the art after reading this disclosure. In other embodiments, combinations or sub-combinations of the above disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method, using a computer, for generating a recipe for generating a physical object, comprising:
    determining characteristics of a plurality of base materials;
    determining a desired set of characteristics for the object to be generated;
    calculating locations of portions of a plurality of base materials that at least approximate the desired set of characteristics for the object to be generated, wherein calculating locations of a plurality of base materials comprises:
    a) generating a data structure corresponding to a search space over a space representative of combinations of at least two of the plurality of base materials having differing characteristics;
    b) storing a representation of an initial position in the search space, wherein the initial position corresponds to a combination of the plurality of base materials;
    c) estimating a prospective set of characteristics that would result from an object made according to the combination of the plurality of base materials corresponding to the initial position;
    d) comparing the prospective set of characteristics with the desired set of characteristics;
    e) determining if a difference between the prospective set of characteristics and the desired set of characteristics is below a target threshold;
    f) if the difference between the prospective set of characteristics and the desired set of characteristics is not below the target threshold, identifying a subsequent position in the search space, wherein the subsequent position is other than the initial position;
    g) storing a representation of the subsequent position;
    h) adjusting the prospective set of characteristics according to the subsequent position; and
    i) repeating steps c) through h) until the difference between the prospective set of characteristics and the desired set of characteristics is below the target threshold; and
    outputting instructions for generating an object from located portions of the plurality of base materials.

2. The method of claim 1, wherein identifying the subsequent position comprises pruning the search space prior to identifying and identifying the subsequent position from portions of the search space not pruned.

3. The method of claim 1, wherein identifying the subsequent position comprises pruning the search space and pruning is done to conform to construction constraints, wherein a construction constraint is a constraint imposed by a physical machine that is to generate the object or imposed by physical properties of one or more of the plurality of base materials.

4. The method of claim 3, wherein construction constraints include a constraint that a location in the search space cannot correspond to having a negative amount of a base material.

5. The method of claim 1, wherein identifying the subsequent position comprises pruning the search space and pruning is done by removing redundant portions of the search space, wherein two or more portions of the search space are redundant if they provide for different locations of base materials in the generated object with the same or similar prospective set of characteristics.

6. The method of claim 1, wherein the characteristics of the plurality of base materials and the desired set of characteristics for the object to be generated include one or more of density, elasticity, heat conduction, heat capacity, and/or hardness.

7. The method of claim 1, wherein the characteristics of the plurality of base materials and the desired set of characteristics for the object to be generated include molecular behavior.

8. An apparatus for generating a physical object with a desired set of characteristics from a combination from a plurality of base materials not having characteristics exactly matching the desired set of characteristics, comprising:
    storage for data representing the characteristics of the plurality of base materials;
    storage for programming instructions;
    a processor, coupled to the storage for data representing the characteristics of the plurality of base materials and the storage for the programming instructions;
    program code, stored in the storage for programming instructions, including program code for performing a pruning search over a search space of combinations of the base materials, wherein the program code for performing a pruning search comprises:
a) program code for generating a data structure corresponding to a search space over a space representative of combinations of at least two of the plurality of base materials having differing characteristics;
b) program code for storing a representation of an initial position in the search space, wherein the initial position corresponds to a combination of the plurality of base materials;
c) program code for estimating a prospective set of characteristics that would result from an object made according to the combination of the plurality of base materials corresponding to the initial position;
d) program code for comparing the prospective set of characteristics with the desired set of characteristics;
e) program code for determining if a difference between the prospective set of characteristics and the desired set of characteristics is below a target threshold;
f) program code for if the difference between the prospective set of characteristics and the desired set of characteristics is not below the target threshold, identifying a subsequent position in the search space, wherein the subsequent position is other than the initial position;
g) program code for storing a representation of the subsequent position;
h) program code for adjusting the prospective set of characteristics according to the subsequent position; and
i) program code for repeating steps c) through h) until the difference between the prospective set of characteristics and the desired set of characteristics is below the target threshold;

a source of the base materials used for a search space solution; and three-dimensional, computer-controlled printer for generating the physical object by placement of the base materials according, at least approximately, to the search space solution.

9. The apparatus of claim 8, wherein the program code for performing the pruning search is configured to account for physical constraints of the three-dimensional, computer-controlled printer.

10. The apparatus of claim 8, wherein the characteristics of the plurality of base materials and the desired set of characteristics for the object to be generated include one or more of density, elasticity, heat conduction, heat capacity, and/or hardness.

11. The apparatus of claim 8, wherein the characteristics of the plurality of base materials and the desired set of characteristics for the object to be generated include molecular behavior.

* * * * *